US012580237B2

(12) United States Patent
Leadley

(10) Patent No.: US 12,580,237 B2
(45) Date of Patent: Mar. 17, 2026

(54) E-CIGARETTE AND RE-CHARGING PACK

(71) Applicant: Nicoventures Trading Limited, London (GB)

(72) Inventor: David Leadley, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 18/498,252

(22) Filed: Oct. 31, 2023

(65) Prior Publication Data

US 2024/0063648 A1 Feb. 22, 2024

Related U.S. Application Data

(63) Continuation of application No. 16/281,332, filed on Feb. 21, 2019, now Pat. No. 11,831,155, which is a
(Continued)

(30) Foreign Application Priority Data

Jul. 29, 2014 (GB) .................................. 1413432.4

(51) Int. Cl.
*H02J 7/00* (2006.01)
*A24F 40/40* (2020.01)
(Continued)

(52) U.S. Cl.
CPC ........... *H01M 10/443* (2013.01); *A24F 40/40* (2020.01); *A24F 40/53* (2020.01); *A24F 40/95* (2020.01);
(Continued)

(58) Field of Classification Search
None
See application file for complete search history.

(56) References Cited

U.S. PATENT DOCUMENTS 5,391,974 A 2/1995 Shiojima et al.
5,723,971 A 3/1998 Sakai et al.
(Continued)

FOREIGN PATENT DOCUMENTS

CN 1372364 A 10/2002
CN 1568556 A 1/2005
(Continued)

OTHER PUBLICATIONS

"Archive version of corresponding product page of bq24190", As retrieved via https://archive.org/Neb/, Retrieved from the Internet: https://www.ti.com/produci/BQ24190, Jan. 4, 2013, 5 pages.
(Continued)

*Primary Examiner* — Arun C Williams
(74) *Attorney, Agent, or Firm* — MERCHANT & GOULD P.C.

(57) ABSTRACT

A pack for containing and recharging an e-cigarette includes: a re-chargeable pack battery; a first connector which is electrically connectable to an external power source; a first recharging mechanism for re-charging the pack battery using the external power source when the first connector is electrically connected to the external power source; a second connector which is electrically connectable to an e-cigarette contained within the pack; and a second recharging mechanism for re-charging the e-cigarette when the e-cigarette is electrically connected to the second connector. The first recharging mechanism includes a first protection circuit module and the second re-charging mechanism includes a second protection circuit module, wherein the protection modules protect the pack and e-cigarette against excessive voltage or current during re-charging.

14 Claims, 9 Drawing Sheets

Related U.S. Application Data continuation of application No. 15/326,592, filed as application No. PCT/GB2015/052152 on Jul. 24, 2015, now Pat. No. 10,276,898.

(51) Int. Cl.

| | |
|---|---|
| *A24F 40/53* | (2020.01) |
| *A24F 40/95* | (2020.01) |
| *H01M 10/42* | (2006.01) |
| *H01M 10/44* | (2006.01) |
| *H01M 10/46* | (2006.01) |
| *H01M 10/48* | (2006.01) |
| *A24F 40/10* | (2020.01) |
| *H01M 50/20* | (2021.01) |

(52) U.S. Cl.
CPC ......... *H01M 10/42* (2013.01); *H01M 10/425* (2013.01); *H01M 10/46* (2013.01); *H01M 10/486* (2013.01); *H02J 7/00304* (2020.01); *H02J 7/00308* (2020.01); *H02J 7/00712* (2020.01); *H02J 7/007194* (2020.01); *A24F 40/10* (2020.01); *H01M 2010/4271* (2013.01); *H01M 50/20* (2021.01); *H01M 2220/30* (2013.01); *H02J 7/00302* (2020.01); *H02J 7/00309* (2020.01)

(56) References Cited

U.S. PATENT DOCUMENTS

| | | | |
|---|---|---|---|
| 5,864,224 | A | 1/1999 | Takechi et al. |
| 10,218,193 | B2 | 2/2019 | Gratton |
| 10,236,708 | B2 | 3/2019 | Schennum et al. |
| 10,276,898 | B2 | 4/2019 | Leadley |
| 10,433,584 | B2 | 10/2019 | Nettenstrom et al. |
| 2003/0025480 | A1* | 2/2003 | Pannwitz ............. H02J 7/0031 361/91.1 |
| 2003/0117112 | A1 | 6/2003 | Chen et al. |
| 2003/0218446 | A1 | 11/2003 | Beerwerth et al. |
| 2003/0226837 | A1 | 12/2003 | Blake et al. |
| 2004/0150367 | A1 | 8/2004 | Cornett et al. |
| 2005/0237028 | A1* | 10/2005 | Denning ............. H02J 7/00308 320/134 |
| 2008/0238362 | A1 | 10/2008 | Pinnell et al. |
| 2008/0258688 | A1 | 10/2008 | Hussain et al. |
| 2009/0009143 | A1* | 1/2009 | Odaohhara ....... H02J 7/007182 320/162 |
| 2009/0179618 | A1 | 7/2009 | Litingtun |
| 2010/0141215 | A1 | 6/2010 | Takeda |
| 2010/0277128 | A1 | 11/2010 | Tam et al. |
| 2011/0036346 | A1 | 2/2011 | Cohen et al. |
| 2011/0226236 | A1 | 9/2011 | Buchberger |
| 2011/0265806 | A1 | 11/2011 | Alarcon |
| 2012/0127619 | A1 | 5/2012 | Mikolajczak |
| 2012/0227753 | A1 | 9/2012 | Newton |
| 2013/0038275 | A1 | 2/2013 | Chen et al. |
| 2013/0192615 | A1 | 8/2013 | Tucker et al. |
| 2013/0241500 | A1 | 9/2013 | Deng et al. |
| 2013/0293186 | A1 | 11/2013 | Chou et al. |
| 2013/0336358 | A1 | 12/2013 | Liu |
| 2014/0053858 | A1 | 2/2014 | Liu |
| 2014/0117784 | A1 | 5/2014 | Weissinger et al. |
| 2014/0278250 | A1 | 9/2014 | Smith et al. |
| 2014/0285937 | A1 | 9/2014 | Xiang |
| 2014/0291179 | A1 | 10/2014 | Xiang |
| 2015/0015187 | A1 | 1/2015 | Xiang |
| 2015/0020831 | A1 | 1/2015 | Weigensberg et al. |
| 2015/0043117 | A1 | 2/2015 | Xiang |
| 2015/0181942 | A1 | 7/2015 | Holzherr et al. |
| 2015/0189916 | A1 | 7/2015 | Wu |
| 2016/0226286 | A1 | 8/2016 | Xiang |
| 2017/0207499 | A1 | 7/2017 | Leadley |
| 2019/0157887 | A1 | 5/2019 | Gratton |
| 2019/0181675 | A1 | 6/2019 | Schennum et al. |

FOREIGN PATENT DOCUMENTS

| | | | |
|---|---|---|---|
| CN | 1764037 | A | 4/2006 |
| CN | 201370098 | Y | 12/2009 |
| CN | 201370099 | Y | 12/2009 |
| CN | 201374580 | Y | 12/2009 |
| CN | 101626087 | A | 1/2010 |
| CN | 101647177 | A | 2/2010 |
| CN | 101675570 | A | 3/2010 |
| CN | 101789531 | A | 7/2010 |
| CN | 201571500 | U | 9/2010 |
| CN | 102204059 | A | 4/2011 |
| CN | 102916461 | A | 2/2013 |
| CN | 202819631 | U | 3/2013 |
| CN | 103124097 | A | 5/2013 |
| CN | 203166461 | U | 8/2013 |
| CN | 203166462 | U | 8/2013 |
| CN | 203166467 | U | 8/2013 |
| CN | 203166473 | U | 8/2013 |
| CN | 203262281 | U | 11/2013 |
| CN | 203326671 | U | 12/2013 |
| CN | 203337806 | U | 12/2013 |
| CN | 203339772 | U | 12/2013 |
| CN | 203368107 | U | 12/2013 |
| CN | 203387219 | U | 1/2014 |
| CN | 203398771 | U | 1/2014 |
| CN | 103579705 | A | 2/2014 |
| CN | 203434223 | U | 2/2014 |
| CN | 203482903 | U | 3/2014 |
| CN | 203504217 | U | 3/2014 |
| CN | 203537022 | U | 4/2014 |
| CN | 203660013 | U | 6/2014 |
| CN | 203662028 | U | 6/2014 |
| EP | 1040547 | A1 | 10/2000 |
| EP | 2043224 | B1 | 4/2009 |
| EP | 2079142 | B1 | 7/2009 |
| EP | 2782201 | A1 | 9/2014 |
| EP | 2921064 | A1 | 9/2015 |
| EP | 3136889 | A1 | 3/2017 |
| JP | 2012228142 | A | 11/2012 |
| JP | 2013168285 | A | 8/2013 |
| RU | 2210841 | C2 | 8/2003 |
| RU | 114228 | U1 | 3/2012 |
| RU | 2492558 | C1 | 9/2013 |
| WO | 9741744 | A1 | 11/1997 |
| WO | 9917418 | A1 | 4/1999 |
| WO | 2012123178 | A3 | 9/2012 |
| WO | 2013093695 | A1 | 6/2013 |
| WO | 2014029880 | A2 | 2/2014 |
| WO | 2014047953 | A1 | 4/2014 |
| WO | 2014075369 | A1 | 5/2014 |
| WO | 2014163664 | A1 | 10/2014 |
| WO | 2015054961 | A1 | 4/2015 |
| WO | 2015165813 | A1 | 11/2015 |

OTHER PUBLICATIONS

"Archive Version of Corresponding product page of bq24295", As retrieved via https ://archive.rg/web/, Retrieved from the Internet: https://www.ti.com/produci/BQ24295, Jan. 5, 2014, 2 pages.

"Archive Version of Corresponding Product Page of bq28550", As retrieved via https://archive.rg/web/, Retrieved from the Internet: https://www.ti.com/product/bq28550, Dec. 7, 2011, 2 pages.

"Battery charging, gauging and protection presentation", Jun. 29, 2010, 22 pages.

Chinese Office Action, Application No. 201580041644.8, dated Apr. 24, 2020, 18 pages.

"Datasheet for Charge Control Chip NE57610", Nov. 5, 2002, 16 pages.

"Expert opinion of Mr Wei Wei", Jan. 12, 2023.

Extended European Search for EP Application No. 20185949.3, mailed on Oct. 29, 2020, 10 pages.

GB Search Report, Application No. GB1413432.4 mailed Mar. 31, 2015, 3 pages.

GB Search Report, Application No. GB1413432.4, mailed Mar. 31, 2015, 9 pages.

(56) References Cited

OTHER PUBLICATIONS

Great Britain Examination Report, Application No. GB1413432.4 dated Aug. 18, 2017, 7 pages.
Great Britain Examination Report, Application No. GB1413432.4 dated Feb. 2, 2018, 5 pages.
Great Britain Examination report, Application No. GB1413432.4, dated Sep. 4, 2018, 5 pages.
Great Britain Search Report, Application No. GB1821033.6, dated May 8, 2019, 7 pages.
"IEEE Standard for Rechargeable Batteries for Cellular Telephones", IEEE Std 1725, 2006, 82 Pages.
International Preliminary Report on Patentability, International Application No. PCT/GB2015/052152 mailed Feb. 21, 2016 17 pages.
International Search Report and Written Opinion, International Application No. PCT/GB2015/052152, Oct. 8, 2015 13 pages.
"JEITA-Compliant, Li+ Charger with Smart Power Selector, Automatic Detection, and USB Enumeration", datasheet for MAX77301, Maxim Integrated, 2012, 70 pages.
"Maxim Integrated Products", Datasheet for MAX8600A, 2009, 12 pages.
Notice of Opposition—Weickmann & Weickmann for European Application No. 15744313.6, mailed on Jun. 2, 2021, 23 pages.
Notice of Opposition—JT International S.A, for European Application No. 15744313.6, mailed on Jun. 2, 2021, 36 pages.
Notice of Opposition—Philip Morris for European Application No. 15744313.6, mailed on Jun. 1, 2021, 73 pages.
Office Action mailed Apr. 14, 2022 for Russian Application No. 2019106530, 15 pages.
Office Action received for Chinese Patent Application No. 201580041644.8, mailed on Oct. 8, 2018, 7 pages.
Office Action received for Russian Patent Application No. 2017102636, mailed on Apr. 20, 2018, 11 pages. (18 pages with Translation).
Oral proceedings by Hoffmann Eitle for European Patent Application No. 3175507, mailed on Jan. 27, 2023, Jan. 27, 2023, 19 pages.
Oral proceedings by Weickmann for European Patent Application No. 3175507, mailed on Jan. 10, 2023, Jan. 10, 2023, 16 pages.
Search Report received for Great Britain Patent Application No. 1821030.2, mailed on Jan. 22, 2019, 6 pages.
Search Report received for Great Britain Patent Application No. 1821032.8, mailed on Jan. 22, 2019, 8 pages.
Search Report received for Great Britain Patent Application No. 1821033.6, mailed on Jan. 18, 2019, 7 pages.
Selected screen captures of Battery charging, gauging and protection Jun. 29, 2010, 7 pages.
Analog Devices, "Compact, 1.5 A Linear Charger for Single-Cell Li+ Battery", ADP2291; 2005; Available from https://www.analog.com/media/en/technical-documentation/data-sheets/adp2291.pdf, 2005, 20 pages.
Barsukov Y., "Battery Power Management for Portable Devices", Artech House Power Engineering, May 1, 2013, ISBN-13 978-1608074914, 56 pages.
Battery University, "All About Chargers", Mar. 7, 2011, Mar. 7, 2011, 4 pages.
Battery University, "Charging Lithium Ion", Retrieved from the Internet: https://web.archive.org/Neb/20140625074339/https://batteryuniversity.com/learn/article/charging_lithium_ion_batteries, Jun. 25, 2014, 3 pages.
Battery University, "Safety Circuits for Modern Batteries", Internet Archive—http://web.archive.rg/web/20 140626163028/https://batteryuniversity.com/learn/article/safety_ circuits for_ modern_ batteries, Jun. 26, 2014, 3 pages.
Beale J., "Transcript of Battery charging, gauging and protection", Retrieved from the Internet: https://training.ti.com/battery-charging-gauging-and-protection, Jun. 29, 2010, 18 pages.
Bourns, "Preventing Component Circuit Damage from Above Range Current with Reliable Overcurrent Protection", 2009, 8 pages.
Bourns Incorporated, "Internet Archive Wayback Machine capture of MF-PSMF Series-PTC Resettable Fuses", Feb. 13, 2014, 3 pages.
Brown D., "Battery Charging Options for Portable Products", Jul. 1, 2006, 9 pages.

Doughty D.H., "A General Discussion of Li Ion Battery Safety", The Electrochemical Society Interface, 2012, 9 pages.
Gunderson D., "Li-ion battery temperature trends during charge and discharge", Sep. 5, 2012, 4 pages.
IEC Standards+, "Secondary Cells and Batteries Containing Alkaline or Other Non-acid Electrolytes Safety Requirements for Portable Sealed Secondary Cells, and for Batteries Made from Them, for Use in Portable Application", S+IEC 62133, Edition 2.0, © IEC, 2012, 118 pages.
Jackson B., "Battery Circuit Architecture", Texas Instruments Incorporated, 2004, 9 pages.
Japan Electronics and Informatio, "A guide to the safe use of secondary ion batteries in 038notebook-type personal computers", Apr. 20, 2007, 18 pages.
Jinrong Qian, "Improving battery safety, charging, and fuel gauging in portable media applications", Texas Instruments Incorporated, Analogue Applications Journal Q1, 2009, 8 pages.
Linear Technology, "LTC3204-3.3/LTC3204-5/LTC3204B-3.3/LTC3204B-5 Low Noise Regulated Charge Pump in 2×2 DFN", Available from https://www.analog.com/media/en/technicaldocumentation/data-sheets/3204 fa.pdf [Accessed Feb. 16, 2019], 2004.
Linear Technology, "LTC4095 Standalone USB Li-Ion/Polymer Battery Charger in 2mm×2mm DFN", Available from https://www.analog.com/media/en/technical-documentation/datasheets/4095fa.pdf [ Accessed Jan. 16, 2019], 2017, 16 pages.
Linear Technology Corporation, "Datasheet for Battery Charger Chip LTC4057", 2003, 12 pages.
Littlefuse Incorporated, "Protecting the Universal Serial Bus from Over Voltage and Overcurrent Threats", Application Notes, Mar. 2001, 4 pages.
Mamyrbayeva Y.Y., "Charge and Discharge Behaviour of Li-Ion Batteries at Various Temperatures Containing LiCo02 Nanostructured Cathode Produced by CCSO", 2013, 6 pages.
Nilsson J.F., "Low Temperature Li-ion Battery Ageing", Sep. 2014, 57 pages., Sep. 2014, 57 pages.
Panasonic, "Li-ion batteries", brochure, 2007, 17 pages.
Panasonic Corporation, "Lithium Ion Batteries Technical Handbook", 2007, 38 pages.
Pistoia G., "Batteries for portable devices", Elsevier, 2005, 4 pages.
Qian, Jinrong, "Li-ion battery-charger solutions for JEITA compliance", Analog Applications http://www.ti.com/cn/lit/an/slyt365.pdf, 2010, 6 pages.
Richtek, "Easy to Use Power Bank Solution (EZPBS™) Integrated Chip with Two Ports Output", Dec. 2014, 16 pages.
Richtek, "Understanding the characteristics of Li-Ion batteries and Richtek power management solutions", Richtek Technology Corporation (2014) https://www.richtek.com/en/Design%2520Support/Technical%2520Document/~/media/AN%2520PDF/AN023_EN.ashx, Jan. 2014, 22 pages.
Samsung Soi Co., Ltd., "Specification of Production for Lithium-ion Rechargeable Cell Model: ICR18650-30A" Nov. 2007, 14 pages.
Scott Dearborn, "Power Management in Portable Applications: Charging Lithium-Ion/Lithium-Polymer Batteries", Microchip Technology; AN947; Dec. 7, 2004; Available from http://ww1.microchip.com/downloads/en/appnotes/00947a.pdf, 16 pages.
Seiko Instruments Inc, "Datasheet for S-8241 Battery Protection IC for 1-Cell Pack", 2013, 39 pages.
Shearer F., "Power Management in Mobile Devices", Elsevier, ISBN: 978-0-7506-7958-9, 2008, 7 pages.
Shenzhen Huatai, "Switchmode Li-Lon Charge Controller HB6293", Available from http://www.huatai-ic.com/adminasd/uppic/201112795406.pdf [Accessed Feb. 16, 2019], Nov. 28, 2011, 14 pages.
Simpson, Chester, "LM2576, LM3420, LP2951, LP2952 Battery Charging", Texas Instruments, 2011 www.ti.com/lit/an/snva557/snva557.pdf, 2011, 19 pages.
Texas Instruments, "BQ2404x 1A, Single-Input, Single Cell Li-Ion and Li-Pol Battery Charger with Auto Start", Available from https://web.archive.org/web/20140522213712/http://www.ti.com/lit/ds/symlink/bq24040.pdf [Accessed Jan. 14, 2019], Feb. 2014, 33 pages.

(56)                    References Cited

OTHER PUBLICATIONS

Texas Instruments, "bq2407x Single-Chip Li-/on Charge and System Power-Path Management IC", Revised Dec. 2014, Mar. 2006, 34 pages.
Texas Instruments, "Datasheet bq24190", Oct. 2012, 38 pages.
Texas Instruments, "Datasheet bq24295", Sep. 2013, 38 pages.
Texas Instruments, "Datasheet bq28550", Sep. 2011, 28 pages.
Texas Instruments, "Datasheet for BQ24040", Sep. 2009, 33 pages.
Texas Instruments, "Datasheet for bq24060", Jun. 2006, 36 pages.
Texas Instruments, "Datasheet for bq2406x", Jun. 2006—Revised, Oct. 2006, 36 pages.
Tyco Electronics Corporation, "Circuit protection considerations for USB 3.0", Application Note, 2009, 4 pages.
Tyco Electronics Corporation, "Poly Zen Protection Device for USB Applications", Datasheet, 2010, 2 pages.
Tyco Electronics Corporation, "USB 2.0 and USB 3.0 Circuit Protection considerations for Hard Disc Drives", Application Note, 2011, 5 pages.
Ultra Life Corporation, "Lithium-ion & Lithium Polymer Cells and Batteries—Safety Precautions", 2010, 4 pages.
Westcott R, "Batteries on planes pose 'increased fire risk'", BBC Transport Correspondent News article dated Feb. 4, 2014 entitled (http://www.bbc.co.uk/news/business-25733346), 3 pages.
Woodbank Communications, "Battery Chargers and Charging Methods", "Electropaedia", [Online]; Available from: https://www.mpoweruk.com/charger.htm, dated Sep. 9, 2018. [Accessed Aug. 28, 2018], 2012.
Woodbank Communications, "Battery Protection Methods", "Electropaedia", [online]; Available from https://www.mpoweruk.com/protection.htm, dated Sep. 9, 2018 [Accessed Aug. 28, 2018], 2012.
Office Action received for Chinese Application No. 202110938114.0, mailed on Jun. 14, 2024, 10 pages (5 pages of English Translation and 5 pages of Official Copy).
Office Action received for Chinese Patent Application No. 202110938107.0, mailed on Apr. 16, 2024, 14 pages (6 pages of English Translation and 8 pages of Official Copy).
Datasheet for ME4507.
Wikipedia entry for "Printed Circuit Board" dated Jul. 24, 2014.
International Patent Application No. PCT/GB2015/052152, Search Report and Written Opinion, mailed Oct. 8, 2015, 13 pages.
European Patent No. 3745524, Notice of Opposition to the Grant of European Patent No. 3745524, dated Oct. 24, 2024, 76 pages.

* cited by examiner

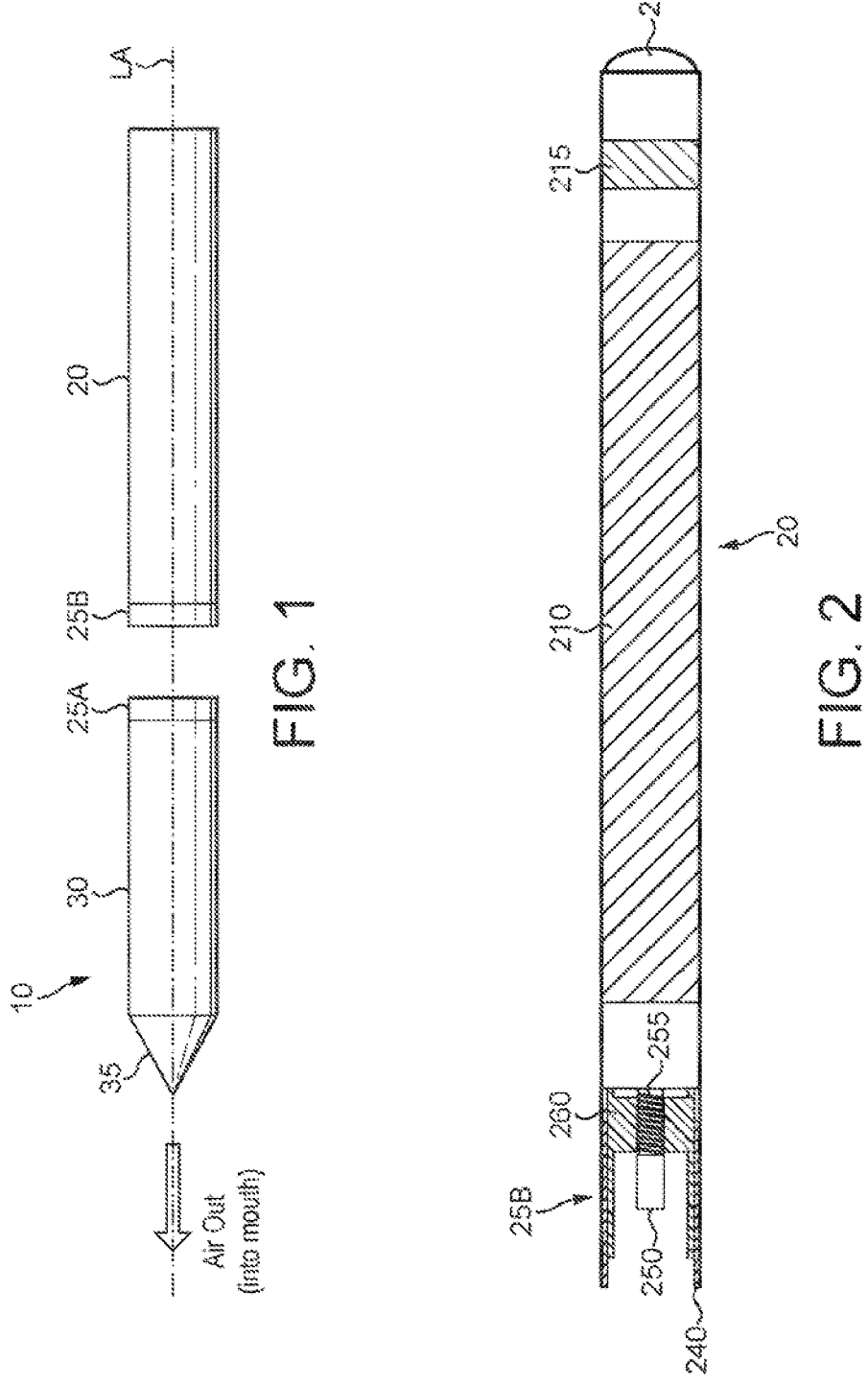

E-CIGARETTE AND RE-CHARGING PACK

CROSS-REFERENCE TO RELATED APPLICATIONS

The preset application is a continuation application of U.S. patent application Ser. No. 16/281,332, filed Feb. 21, 2021, which is a continuation application of U.S. patent application Ser. No. 15/326,592 filed Jan. 16, 2017, which in turn is a National Phase entry of PCT Application No. PCT/GB2015/052152, filed on 24 Jul. 2015, which claims priority to GB Patent Application No. 1413432.4, filed on 29 Jul. 2014, all of which are hereby fully incorporated herein by reference.

TECHNICAL FIELD

The present application relates to an e-cigarette, such as an electronic vapor provision system or an electronic nicotine delivery system, and a re-charging pack for the e-cigarette.

BACKGROUND

Electronic vapor provision systems, electronic nicotine delivery systems, etc, which are collectively referred to herein as e-cigarettes, generally contain a reservoir of liquid which is to be vaporized. When a user sucks or draws on the device, this activates a heater to vaporize a small amount of liquid, which is then inhaled by the user. Most e-cigarettes include a re-chargeable battery for supplying electrical power to the heater and other electrical/electronic components, such as a sensor to detect inhalation. Some e-cigarettes have a cartridge section. After the nicotine or other liquid in this cartridge has been exhausted, the empty cartridge can be removed or separated from the e-cigarette and replaced with a new cartridge containing further nicotine.

E-cigarettes are often supplied in packs for protection and easy portability. Such packs may accommodate multiple e-cigarettes and/or replacement cartridges, thereby offering a backup facility if one e-cigarette (or its cartridge) is exhausted. An e-cigarette pack may also have the ability to re-charge an e-cigarette, again helping to ensure good operating availability of the e-cigarette for a user. Typically a pack is provided with a cylindrical hole for receiving an e-cigarette for recharging, the hole generally reflecting the elongated, cylindrical shape of an e-cigarette. When the e-cigarette is located in the hole, the battery can be re-charged by a suitable wired or wireless connection (a wireless connection may rely upon induction charging). In some packs, the cylindrical hole may receive the entire e-cigarette for re-charging, while in other packs only a portion of the e-cigarette may be received into the hole.

In some devices, the pack must be connected to a power supply, e.g. a mains outlet or USB connection, during re-charging of the e-cigarette battery. In this case, the pack is typically acting as a convenient device for holding and interfacing to the e-cigarette during re-charging. In other devices, the pack itself is provided with a battery (or other charge storage facility). The pack battery allows the e-cigarette to be re-charged from the pack without the need for the pack to be connected to an external power supply during re-charging, thereby providing greater convenience for a user.

The pack battery will be depleted in due course, and so is generally provided with its own re-charging facility—typi-cally again reliant upon some form of mains or USB connection. However, since the pack is larger than an e-cigarette, it can accommodate a larger battery and therefore the pack does not have to be re-charged as frequently as an e-cigarette. For example, the charge capacity of a typical e-cigarette battery may be approximately 60 mAh, whereas the charge capacity of a typical pack battery might be in the region of 800 mAh. Accordingly, the pack battery is capable of re-charging the e-cigarette a few times at least before the pack battery itself needs to be re-charged.

Such a multiple or hierarchical arrangement of separately chargeable systems, namely firstly an e-cigarette and secondly a pack for the e-cigarette, is relatively rare. In contrast, most re-chargeable devices, e.g. mobile (cell) phones, are usually connected directly to a mains-powered charging supply (or else to an in-car charging supply).

It is desirable for the operation and (re)charging of an e-cigarette and associated pack to be as safe, reliable and convenient for a user as possible. One potential concern relates to the lithium ion batteries that are used in many types of device, including e-cigarettes, because of their high energy density. If such a battery is defective, it may, on rare occasions, catch fire—see, for example, the news article dated 4 Feb. 2014 entitled "Batteries on planes pose 'increased fire risk'" (http://www.bbc.co.uk/news/business-25733346). Although some existing e-cigarettes may incorporate certain safety features to address such issues, these have generally been incorporated in an ad hoc (rather than systematic) manner.

SUMMARY

A pack is provided for containing and recharging an e-cigarette. The pack comprises: a re-chargeable pack battery; a first connector which is electrically connectable to an external power source; a first recharging mechanism for re-charging the pack battery using the external power source when the first connector is electrically connected to the external power source; a second connector which is electrically connectable to an e-cigarette contained within the pack; and a second recharging mechanism for re-charging the e-cigarette when the e-cigarette is electrically connected to the second connector. The first recharging mechanism comprises a first protection circuit module for preventing electrical power flow from the external power source to the pack battery when the current supplied to the pack battery exceeds a first predetermined current threshold or the voltage supplied to the pack battery exceeds a first predetermined voltage threshold. The second re-charging mechanism comprises a second protection circuit module for preventing electrical power flow from the pack battery to the e-cigarette when the current supplied by the pack battery exceeds a second predetermined current threshold or the voltage supplied by the pack battery exceeds a second predetermined voltage threshold.

A rechargeable e-cigarette is provided comprising: a battery; a connector which is electrically connectable to an external battery pack; and a recharging mechanism for re-charging the battery using the external battery pack when the connector is electrically connected to the external battery pack. The recharging mechanism comprises a charge controller for controlling electrical power flow from the external battery pack to the battery; a temperature sensor which is response to the temperature of the battery; and a timer. The charging controller is configured to prevent electrical power flow from the external battery pack to the battery when the temperature of the battery is determined to lie outside a range defined between a lower temperature threshold and an upper temperature threshold. The timer is configured to start timing when electrical power starts flowing from the external battery pack to the battery and to prevent electrical power flow from the external battery pack to the battery after a predetermined time period has elapsed.

The present approach is not restricted to specific embodiments such as set out herein, but features from different embodiments may be combined, modified, omitted or replaced by the skilled person according to the circumstances of any given implementation.

BRIEF DESCRIPTION OF THE DRAWINGS

Various embodiments of the disclosure will now be described in detail by way of example only with reference to the following drawings:

FIG. 1 is a schematic (exploded) diagram of an e-cigarette in accordance with some embodiments of the disclosure.

FIG. 2 is a schematic (simplified) diagram of a body of the e-cigarette of FIG. 1 in accordance with some embodiments of the disclosure.

DETAILED DESCRIPTION

Figure 3:
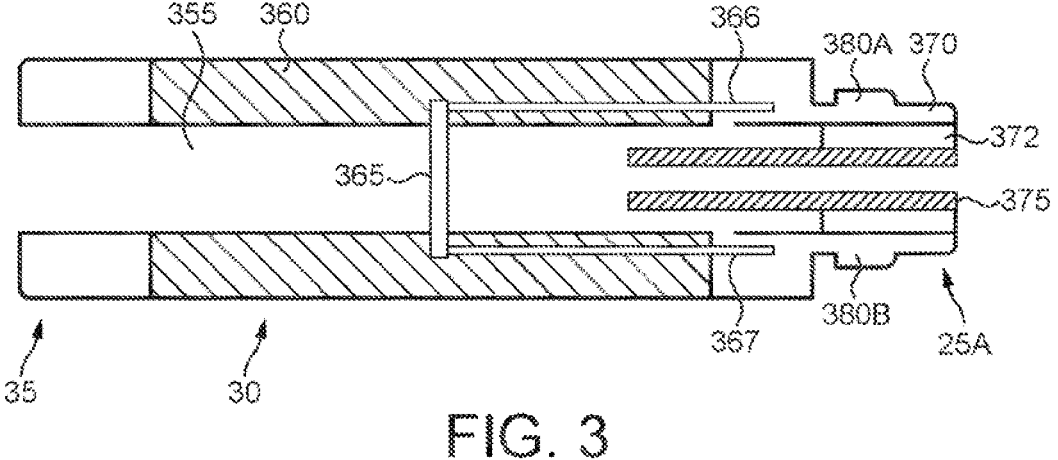
FIG. 3 is a schematic diagram of a cartomizer of the e-cigarette of FIG. 1 in accordance with some embodiments of the disclosure.

FIG. 1 is a schematic diagram of an electronic vapor provision system such as an e-cigarette 10 in accordance with some embodiments of the disclosure (not to scale). The e-cigarette 10 has a generally cylindrical shape, extending along a longitudinal axis indicated by dashed line LA, and comprises two main components, namely a body 20 and a cartomizer 30. The cartomizer 30 includes an internal chamber containing a reservoir of nicotine, a vaporizer (such as a heater), and a mouthpiece 35. The reservoir may be a foam matrix or any other structure for retaining the nicotine until such time that it is required to be delivered to the vaporizer. The cartomizer 30 also includes a heater for vaporizing the nicotine and may further include a wick or similar facility to transport a small amount of nicotine from the reservoir to a heating location on or adjacent the heater.

The body 20 includes a re-chargeable cell or battery to provide power to the e-cigarette 10 and a circuit board for generally controlling the e-cigarette 10. When the heater receives power from the battery, as controlled by the circuit board, the heater vaporizes the nicotine and this vapor is then inhaled by a user through the mouthpiece.

The body 20 and cartomizer 30 are detachable from one another by separating in a direction parallel to the longitudinal axis LA, as shown in FIG. 1, but are joined together when the device is in use by a connection, indicated schematically in FIG. 1 as 25A and 25B, to provide mechanical and electrical connectivity between the body 20 and the cartomizer 30. The electrical connector on the body 20 that is used to connect to the cartomizer 30 also serves as a socket for connecting a charging device (not shown) when the body 20 is detached from the cartomizer 30. The other end of the charging device can be plugged into a USB socket to re-charge the cell in the body of the e-cigarette 10. In other implementations, a cable may be provided for direct connection between the electrical connector on the body 20 and a USB socket.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette 10. This airflow (or the resulting change in pressure) is detected by a pressure sensor that in turn activates the heater to vaporize the nicotine from the cartridge. The airflow passes through, and combines with, the nicotine vapor, and this combination of airflow and nicotine vapor then passes out of the mouthpiece 35 to be inhaled by a user. The cartomizer 30 may be detached from the body 20 and disposed of when the supply of nicotine is exhausted (and replaced with another cartomizer 30 if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece (which can be replaced when the nicotine from the reservoir is exhausted), and a vaporizer comprising a heater (which is generally retained). In other embodiments, the e-cigarette 10, the body 20 and the cartomizer 30 may be joined together permanently, so in effect they are just a single component. Some such unitary (one-piece) e-cigarettes may allow replenishing of a nicotine reservoir when exhausted using some suitable (re)supply mechanism; other one-piece e-cigarettes may be disposed of once the nicotine reservoir has been exhausted. Note that this latter type of device still generally supports re-charging because the battery will normally become depleted more quickly than the nicotine reservoir. The skilled person will be aware of many further possible designs and implementations of an e-cigarette.

FIG. 2 is a schematic (simplified) diagram of the body 20 of the e-cigarette 10 of FIG. 1 in accordance with some embodiments of the disclosure. FIG. 2 can generally be regarded as a cross-section in a plane through the longitudinal axis LA of the e-cigarette 10. Note that various components and details of the body 20, e.g. such as wiring and more complex shaping, have been omitted from FIG. 2 for reasons of clarity.

As shown in FIG. 2, the body 20 includes a battery or cell 210 for powering the e-cigarette 10, as well as a chip, such as an application specific integrated circuit (ASIC) or microcontroller for controlling the e-cigarette 10. The ASIC may be positioned alongside or at one end of the battery 210. The ASIC is attached to a sensor unit 215 to detect an inhalation on mouthpiece 35 (or alternatively the sensor unit 215 may be provided on the ASIC itself). In response to such a detection, the ASIC provides power from the battery or cell 210 to a heater in the cartomizer to vaporize nicotine into the airflow which is inhaled by a user.

The body 20 further includes a cap 225 to seal and protect the far (distal) end of the e-cigarette 10. There is an air inlet hole provided in or adjacent to the cap 225 to allow air to enter the body and flow past the sensor unit 215 when a user inhales on the mouthpiece 35. This airflow therefore allows the sensor unit 215 to detect the user inhalation. The cap 225 may also comprise a pair of electrical contacts which allow the e-cigarette 10 to be charged using these electrical contacts (in addition to, or instead of, USB charging or the like using the connector 25B). This is explained in more detail below.

At the opposite end of the body 20 from the cap 225 is the connector 25B for joining the body 20 to the cartomizer 30. The connector 25B provides mechanical and electrical connectivity between the body 20 and the cartomizer 30. The connector 25B includes a body connector 240, which is metallic (silver-plated in some embodiments) to serve as one terminal for electrical connection (positive or negative) to the cartomizer 30. The connector 25B further includes an electrical contact 250 to provide a second terminal for electrical connection to the cartomizer 30 of opposite polarity to the first terminal, namely body connector 240. The electrical contact 250 is mounted on a coil spring 255. When the body 20 is attached to the cartomizer 30, the connector 25A on the cartomizer 30 pushes against the electrical contact 250 in such a manner as to compress the coil spring in an axial direction, i.e. in a direction parallel to (co-aligned with) the longitudinal axis LA. In view of the resilient nature of the spring 255, this compression biases the spring 255 to expand, which has the effect of pushing the electrical contact 250 firmly against connector 25A, thereby helping to ensure good electrical connectivity between the body 20 and the cartomizer 30. The body connector 240 and the electrical contact 250 are separated by a trestle 260, which is made of a non-conductor (such as plastic) to provide good insulation between the two electrical terminals. The trestle 260 is shaped to assist with the mutual mechanical engagement of connectors 25A and 25B.

FIG. 3 is a schematic diagram of the cartomizer 30 of the e-cigarette 10 of FIG. 1 in accordance with some embodiments of the disclosure. FIG. 3 can generally be regarded as a cross-section in a plane through the longitudinal axis LA of the e-cigarette 10. Note that various components and details of the body 20, e.g. such as wiring and more complex shaping, have been omitted from FIG. 3 for reasons of clarity.

The cartomizer 30 includes an air passage 355 extending along the central (longitudinal) axis of the cartomizer 30 from the mouthpiece 35 to the connector 25A for joining the cartomizer 30 to the body 20. A reservoir of nicotine 360 is provided around the air passage 335. This reservoir 360 may be implemented, for example, by providing cotton or foam soaked in nicotine. The cartomizer 30 also includes a heater 365 for heating nicotine from reservoir 360 to generate nicotine vapor to flow through air passage 355 and out through mouthpiece 35 in response to a user inhaling on the e-cigarette 10. The heater 365 is powered through lines 366 and 367, which are in turn connected to opposing polarities (positive and negative, or vice versa) of the battery 210 via connector 25A (the details of the wiring between the power lines 366 and 367 and connector 25A are omitted from FIG. 3).

The connector 25A includes an inner electrode 375, which may be silver-plated or made of some other suitable metal. When the cartomizer 30 is connected to the body 20, the inner electrode 375 contacts the electrical contact 250 of the body 20 to provide a first electrical path between the cartomizer 30 and the body 20. In particular, as the connectors 25A and 25B are engaged, the inner electrode 375 pushes against the electrical contact 250 so as to compress the coil spring 255, thereby helping to ensure good electrical contact between the inner electrode 375 and the electrical contact 250.

The inner electrode 375 is surrounded by an insulating ring 372, which may be made of plastic, rubber, silicone, or any other suitable material. The insulating ring is surrounded by the cartomizer connector 370, which may be silver-plated or made of some other suitable metal or conducting material. When the cartomizer 30 is connected to the body 20, the cartomizer connector 370 contacts the body connector 240 of the body 20 to provide a second electrical path between the cartomizer 30 and the body 20. In other words, the inner electrode 375 and the cartomizer connector 370 serve as positive and negative terminals (or vice versa) for supplying power from the battery 210 in the body 20 to the heater 365 in the cartomizer 30 via supply lines 366 and 367 as appropriate.

The cartomizer connector 370 is provided with two lugs or tabs 380A, 380B, which extend in opposite directions away from the longitudinal axis of the e-cigarette 10. These tabs are used to provide a bayonet fitting in conjunction with the body connector 240 for connecting the cartomizer 30 to the body 20. This bayonet fitting provides a secure and robust connection between the cartomizer 30 and the body 20, so that the cartomizer 30 and body 20 are held in a fixed position relative to one another, without wobble or flexing, and the likelihood of any accidental disconnection is very small. At the same time, the bayonet fitting provides simple and rapid connection and disconnection by an insertion followed by a rotation for connection, and a rotation (in the reverse direction) followed by withdrawal for disconnection. It will be appreciated that other embodiments may use a different form of connection between the body 20 and the cartomizer 30, such as a snap fit or a screw connection.

Figure 4:
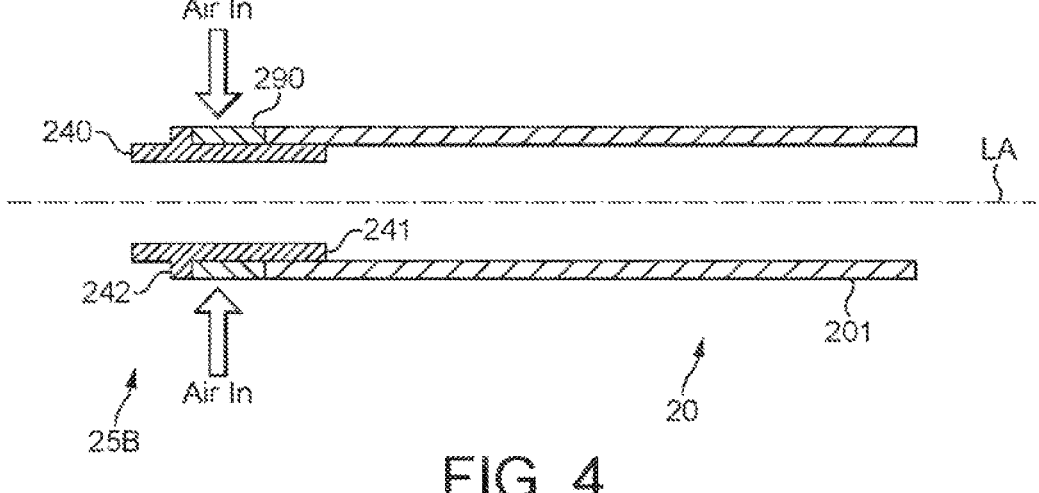
FIG. 4 is a schematic diagram of certain details of a connector at one end of the body of the e-cigarette of FIG. 1 in accordance with some embodiments of the disclosure.

FIG. 4 is a schematic diagram of certain details of the connector 25B at the end of the body 20 in accordance with some embodiments of the disclosure (but omitting for clarity most of the internal structure of the connector as shown in FIG. 2, such as trestle 260). In particular, FIG. 4 shows the external housing 201 of the body 20, which generally has the form of a cylindrical tube. This external housing 201 may comprise, for example, an inner tube of metal with an outer covering of paper or similar.

The body connector 240 extends from this external housing 201 of the body 20. The body connector 240 as shown in FIG. 4 comprises two main portions, a shaft portion 241 in the shape of a hollow cylindrical tube, which is sized to fit just inside the external housing 201 of the body 20, and a lip portion 242 which is directed in a radially outward direction, away from the main longitudinal axis (LA) of the e-cigarette 10. Surrounding the shaft portion 241 of the body connector 240, where the shaft portion 241 does not overlap with the external housing 201, is a collar or sleeve 290, which is again in a shape of a cylindrical tube. The collar 290 is retained between the lip portion 242 of the body connector 240 and the external housing 201 of the body 20, which together prevent movement of the collar 290 in an axial direction (i.e. parallel to axis LA). However, collar 290 may be free to rotate around the shaft portion 241 (and hence also axis LA).

As mentioned above, the cap 225 is provided with an air inlet hole to allow air to flow past sensor 215 when a user inhales on the mouthpiece 35. However, the majority of air that enters the device when a user inhales flows through collar 290 and body connector 240 as indicated by the two arrows in FIG. 4. (The collar 290 and the body connector 240 are provided with holes, not shown in FIG. 4, to support such airflow.)

Figure 5:
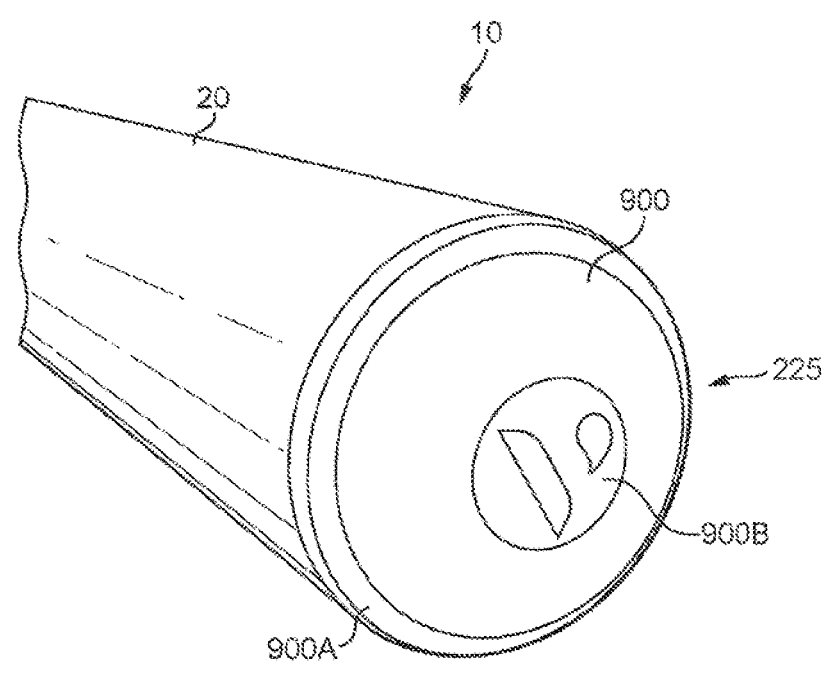
FIG. 5 illustrates a cap with a connector at another end of the body of the e-cigarette of FIG. 1 in accordance with some embodiments of the disclosure.

FIG. 5 shows the cap or tip 225 of the body 20 of the e-cigarette 10 in accordance with some embodiments of the disclosure. The cap 225 comprises a connector 900 comprising two electrical contacts 900A, 900B. The electrical contact 900B is a circular point-type contact located at the center of the cap 225. The electrical contact 900A is a circular ring which is concentric with the contact 900A and provided around the outside or rim of the cap 225. It will, however, be appreciated that any other shape configuration of the electrical contacts could be used. The electrical contacts 900A, 900B are typically made of metal and are connectable to positive and negative electrical terminals of a recharging e-cigarette pack so as to (re)charge the e-cigarette 10 (as explained in more detail later on). The tip of the e-cigarette 10, in particular connector 900, may be covered by a user-removable protective tab or similar while shipping or before use to protect against the battery 210 accidentally discharging prior to first use by a consumer. This helps to ensure that the battery 210 is delivered in an acceptable state to the consumer, and also that damage which might be caused by heating due to unexpected current flows from the battery 210 is avoided.

Figure 6:
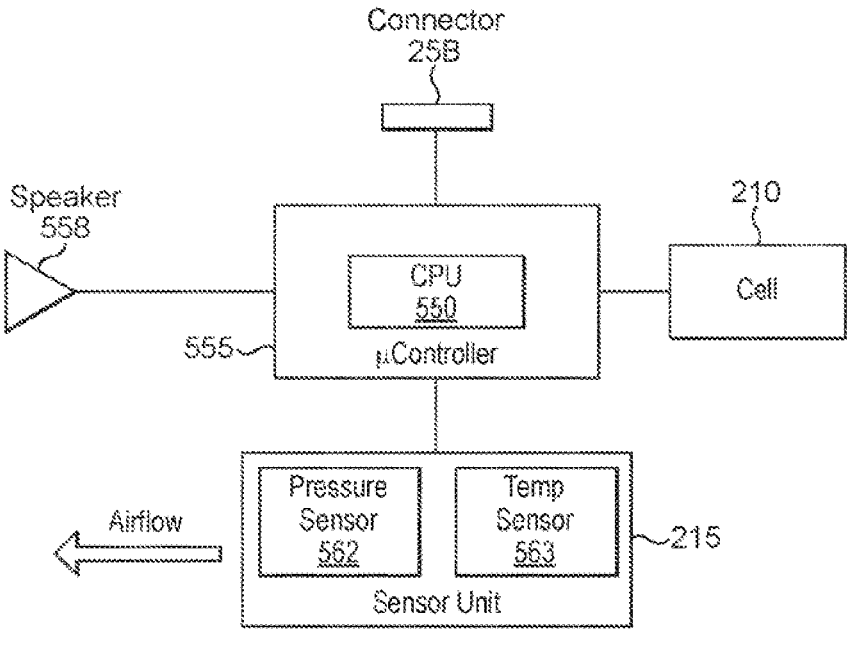
FIG. 6 is a schematic diagram of the main functional components of the body of the e-cigarette of FIG. 1 in accordance with some embodiments of the disclosure.

FIG. 6 is a schematic diagram of the main functional components of the body 20 of the e-cigarette 10 of FIG. 1 in accordance with some embodiments of the disclosure. These components may be mounted on the circuit board provided within the body 20, although depending on the particular configuration, in some embodiments, one or more of the components may instead be accommodated in the body 20 to operate in conjunction with the circuit board, but is/are not physically mounted on the circuit board itself.

The body 20 includes the sensor unit 215 located in or adjacent to the air path through the body 20 from the air inlet to the air outlet (to the vaporizer). The sensor unit 215 includes a pressure drop sensor 562 and temperature sensor 563 (also in or adjacent to this air path). The body 20 further includes a small speaker 558 and an electrical socket or connector 25B for connecting to the cartomizer 30 or to a USB charging device. (The body may also be provided with a tip connector 900, such as discussed above in relation to FIG. 5.)

The microcontroller (e.g. an ASIC) 555 includes a CPU 550. The operations of the CPU 550 and other electronic components, such as the pressure sensor 562, are generally controlled at least in part by software programs running on the CPU 550 (or other component). Such software programs may be stored in non-volatile memory, such as ROM, which can be integrated into the microcontroller 555 itself, or provided as a separate component. The CPU 550 may access the ROM to load and execute individual software programs as and when required. The microcontroller 555 also contains appropriate communications interfaces (and control software) for communicating as appropriate with other devices in the body 10, such as the pressure sensor 562.

The CPU 550 controls the speaker 558 to produce audio output to reflect conditions or states within the e-cigarette 10, such as a low battery warning. Different signals for signaling different states or conditions may be provided by utilizing tones or beeps of different pitch and/or duration, and/or by providing multiple such beeps or tones. The e-cigarette 10 may also be provided with an LED indicator (instead of or as well as speaker 558) to provide visual output to a user, such as a warning of low battery charge.

As noted above, the e-cigarette 10 provides an air path from the air inlet through the e-cigarette 10, past the pressure drop sensor 562 and the heater (in the vaporizer or cartomizer 30), to the mouthpiece 35. Thus when a user inhales on the mouthpiece of the e-cigarette 10, the CPU 550 detects such inhalation based on information from the pressure drop sensor. In response to this detection, the CPU 550 supplies power from the battery or cell 210 to the heater, which thereby heats and vaporizes the nicotine from the wick for inhalation by the user. The level of power supplied to the heater may be controlled on the basis of information from the pressure sensor and/or the temperature sensor 563, for example, to help regulate the nicotine delivery to the user according to the current ambient air pressure and temperature.

Figure 7:
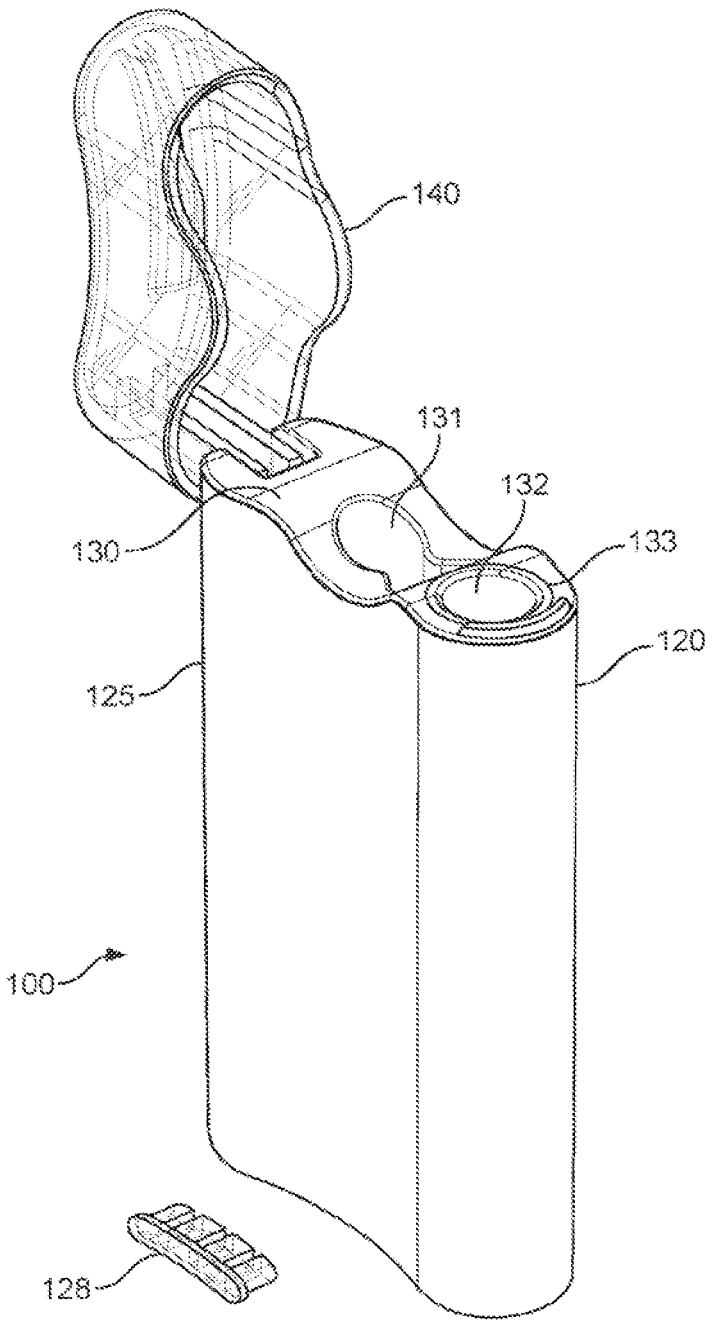
FIG. 7 illustrates a pack for receiving and accommodating an e-cigarette in accordance with some embodiments of the disclosure.

FIG. 7 illustrates a pack 100 for receiving and accommodating an e-cigarette 10 in accordance with some embodiments of the disclosure. The pack 100 comprises a body 120 which is provided with a hinged lid 140 that can open and close. The body 120 comprises an outer case or housing 125 which is fitted with an insert 130. More particularly, the outer case 125 has an opening at the top, i.e. the end at which the lid is located, and the insert 130 is fitted into, and generally closes, this opening. The insert 130 itself is provided with two openings or holes that extend down into the body 120 of the pack 100. The first opening 132 comprises a substantially circular hole (in terms of cross-sectional shape). The first opening 132 is surrounded by an annular light element 133. The second opening 131 in the insert comprises a pair of linked holes (only one of which is easily visible in FIG. 7). The openings 132 and 131 (and more particularly, each of the pair of holes formed by opening 131) can be used to receive an appropriately shaped object, such as an e-cigarette, a spare or used cartridge, etc. The dimensions of pack 100 are generally arranged so that an e-cigarette accommodated within openings 132 or 131 protrudes slightly out of this opening. This allows a user to readily discern the contents of pack 100 (as also helped by making lid 140 transparent), and also facilitates removal by a user of an e-cigarette located within one of these openings.

The pack 100 is further provided with a set of LED lights 128. These are shown separated from the casing 125 in FIG. 7 in an exploded view, but in the assembled pack 100 are integrated into the body 120 so as to lie flush with the outer casing 125. These LED lights 128 can be used to indicate the charging state of the pack 100, for example, whether it is fully charged, partly charged, or fully discharged. The LED lights 128 may also be used to indicate whether or not the pack 100 is currently charging (being charged). Such charging may be accomplished via a (mini or micro) USB link using a (mini or micro) USB connector located on the underside of the pack 100 (not visible in FIG. 7).

Figure 8:
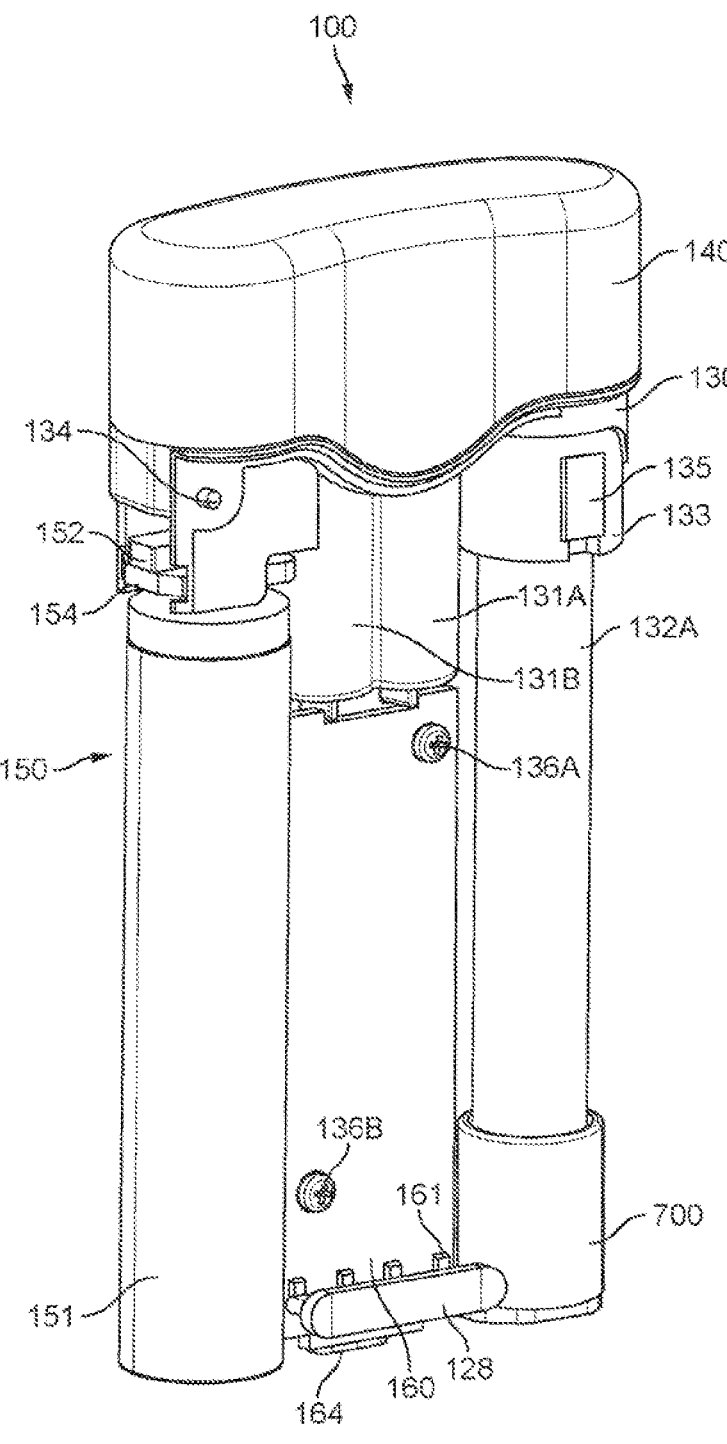
FIG. 8 illustrates the main components that are housed within the body of the pack of FIG. 7 in accordance with some embodiments of the disclosure.

FIG. 8 illustrates the main components that are housed within the body 120 of the pack 100, more particularly, within housing 125, in accordance with some embodiments of the disclosure (some minor components, such as internal wiring, are omitted for reasons of clarity). The body includes a battery unit 150 comprising a battery 151, a printed circuit board (PCB) 154, and a switch 152. The body 120 can be seen to include a hinge or axle 134, which provides a pivot about which the lid 140 is able to open and shut. The battery unit 150, including the switch 152, is located substantially below the hinge 134. The switch 152 is activated as the lid 140 is opened or closed, and this activation of the switch 152 then, in turn, is able to trigger activation of the LED lights, etc.

As illustrated in FIG. 8, the insert 130 extends substantially to the bottom of the outer casing 125. The insert defines a substantially cylindrical tube 132A extending down from opening 132 (see FIG. 7), which is able to receive and hold an e-cigarette. The insert further includes two further substantially cylindrical tubes 131A, 131B, which overlap one another, extending down from opening 131 (see FIG. 7) with a "figure-of-8" cross-section. Note that the bottom of tubes 131A and 131B may be closed by the insert 130 itself, or may be open, but abutting against the bottom of the outer casing 125, which would then have the effect of again closing the bottom of the tubes 131A and 131B in order to retain an e-cigarette (or other item, such as a spare cartridge, therein). The configuration of the bottom of the tube 132A is explained in more detail later on.

Note that the battery 151 is relatively large—comparable in size, for example, with the opening 132 and associated tube 132A for receiving an e-cigarette. Consequently the battery 151 of the pack 100 will usually have significantly greater electrical storage capacity than a battery provided in an e-cigarette which may be accommodated within the pack 100. This allows the battery in the e-cigarette to be recharged, typically several times, using the battery unit 150 of pack 100, without the need for any additional, external power supply (such as a mains connection). This can be very convenient for a user, who may be in a location or situation which does not provide a ready connection to the mains power supply.

In order to support this re-charging of an e-cigarette stored within the pack 100, the bottom portion of the tube 132A is located within an e-cigarette connection assembly 700. The e-cigarette connection assembly 700 allows an electrical connection to be made between the pack 100 and the electrical contacts 900A, 900B on the cap 225 of the e-cigarette 10 when the e-cigarette 10 is inserted into the tube 132A, thus allowing the e-cigarette battery 210 to be charged using the pack battery 151. This is explained in more detail below.

The insert 130 is provided with printed circuit boards (PCBs) 135 and 160. The PCB 160 provides the main control functionality of the pack 100 and is attached to tubes 131A, 131B by screws 136A, 136B, thereby retaining the PCB 160 in the appropriate position relative to the tubes 131A, 131B. A mini-USB (or micro-USB) connector 164 is provided at the bottom of the PCB 160, and is accessible through a corresponding aperture in the underside of the housing 125 of the pack body 120. This USB connector 164 can be used to connect an external power supply to the pack 100 for re-charging the battery 151 (and also any e-cigarette located in tube 132A). The USB connector 164 may also be used, if so desired, for communications with the electronics of the pack 100 and/or e-cigarette 10, for example to update software on the PCB 160 and/or to download usage data from the e-cigarette 10, etc. The PCB 160 is further provided with a set of physical and mechanical connectors 161 for retaining and operating the LED lighting 128. In particular, the PCB 160 controls the LED lighting element 128 to provide an indication to a user about the current charging situation of the pack 100, plus any other suitable information.

The PCB 135 is located on the outside of re-charging tube 132A, relatively near the top, i.e. closer to the hole or opening 132 for receiving an e-cigarette for re-charging. This PCB 135 incorporates at least one light emitting diode (LED), which is used to illuminate the annular light element 133. The PCB 135, LED and annular light element 133 are used to provide an indication to a user about the current charging situation of an e-cigarette located within tube 132A pack 100, plus any other suitable information.

Figure 9A:
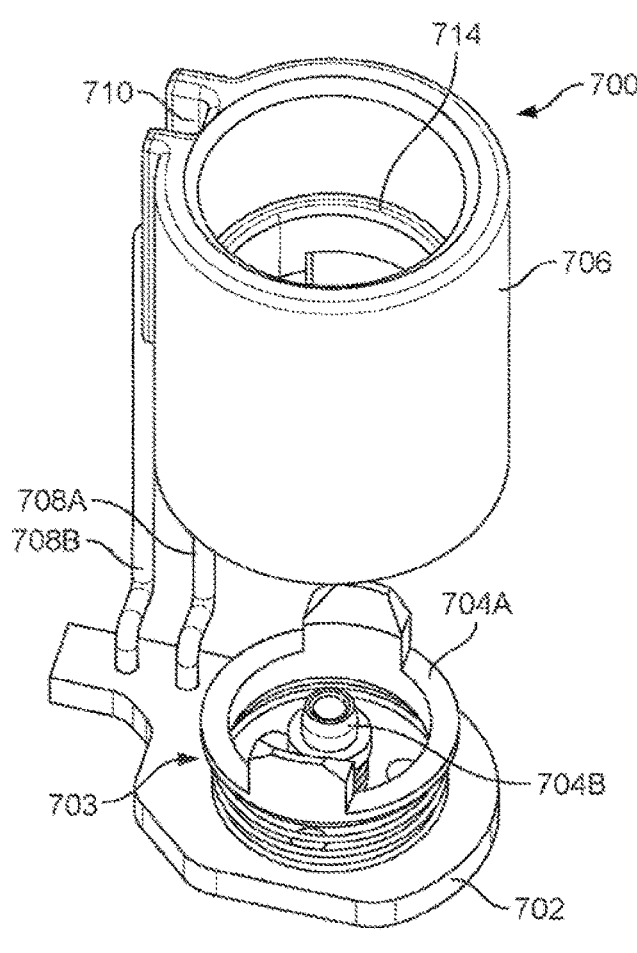
FIGS. 9A and 9B illustrate (in an exploded view) an e-cigarette connection assembly 700 of the pack of FIG. 7 in accordance with some embodiments of the disclosure.
Figure 9B:
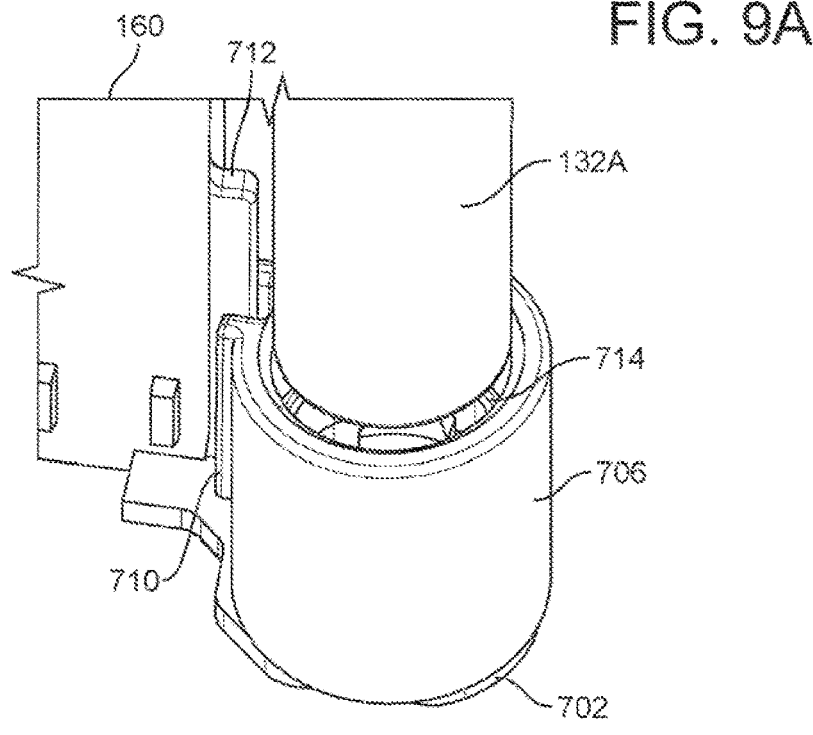

FIGS. 9A and 9B show (in an exploded view) the e-cigarette connection assembly 700 in more detail in accordance with some embodiments of the disclosure. The e-cigarette connection assembly 700 comprises a base 702, which is located on the base of the pack 100, and a connector 703, which has two electrical contacts 704A, 704B for making an electrical connection with the electrical contacts 900A, 900B on the cap 225 of the e-cigarette 10 when the e-cigarette 10 is inserted into the tube 132A. Specifically, the outer electrical contact 704A makes an electrical connection with electrical contact 900A on the e-cigarette 10 and the inner electrical contact 704B makes an electrical connection with the electrical contact 900B on the e-cigarette 10. The electrical contacts 704A, 704B are connected to the PCB 160 via wires 708A, 708B and, under the control of the PCB 160, act as positive and negative electrodes for charging the e-cigarette 10 with power supplied from the battery 151. The electrical contacts 704A, 704B are spring-mounted on the base 702 so as to ensure good electrical connection with the electrical contacts 900A, 900B on the cap 225 of the e-cigarette 10. Electrical conductors connecting the electrical contacts 704A, 704B and the wires 708A, 708B may extend along the surface of the base 702 or may extend through a bore through the base 702, for example.

The e-cigarette connection assembly 700 further comprises a cylindrical tube 706 which is fixed to the base 702. A portion of the cylindrical tube 706 is configured to receive an end portion of the tube 132A. The inner diameter of the portion of the cylindrical tube 706 which receives the end portion of the tube 132A is set such that the outer surface of the end portion of the tube 132A frictionally engages with the inner surface of the cylindrical tube 706. The inner surface of the cylindrical tube 706 further comprises a rib 714 which abuts the end of the tube 132A and ensures that only an end portion of the tube 132A having a predetermined length is able to enter the cylindrical tube 706. The cylindrical tube 706 further comprises a groove 710 on its outer surface which engages with a rib 712 on the PCB 160.

When the insert 130 and e-cigarette connection assembly 700 are inserted into the outer case 125, the base 702 abuts the bottom inner surface of the outer case 125. The insert 130 and e-cigarette connection assembly 700 are held in place within the outer case 125 (and also in relation to one another).

It will be appreciated that the configuration and arrangement of the pack 100 and insert 130 shown in FIGS. 7, 8 and 9 are provided by way of example, and the skilled person will be aware of many potential variations—e.g. the number, position, size and/or shape of holes 131, 132 may vary from one embodiment to another, likewise the associated tubes 131A, 131B, 132A. Similarly, the details of the positioning, shape and size of the battery unit 150, PCB 160, and other components will generally vary from one embodiment to another, depending upon the particular circumstances and requirements of any given implementation. It is also noted that the shape and positioning of the electrical contacts 704A, 704B will be adapted according to different shape and positional configurations of electrical contacts 900A, 900B on the e-cigarette 10.

Figure 10:
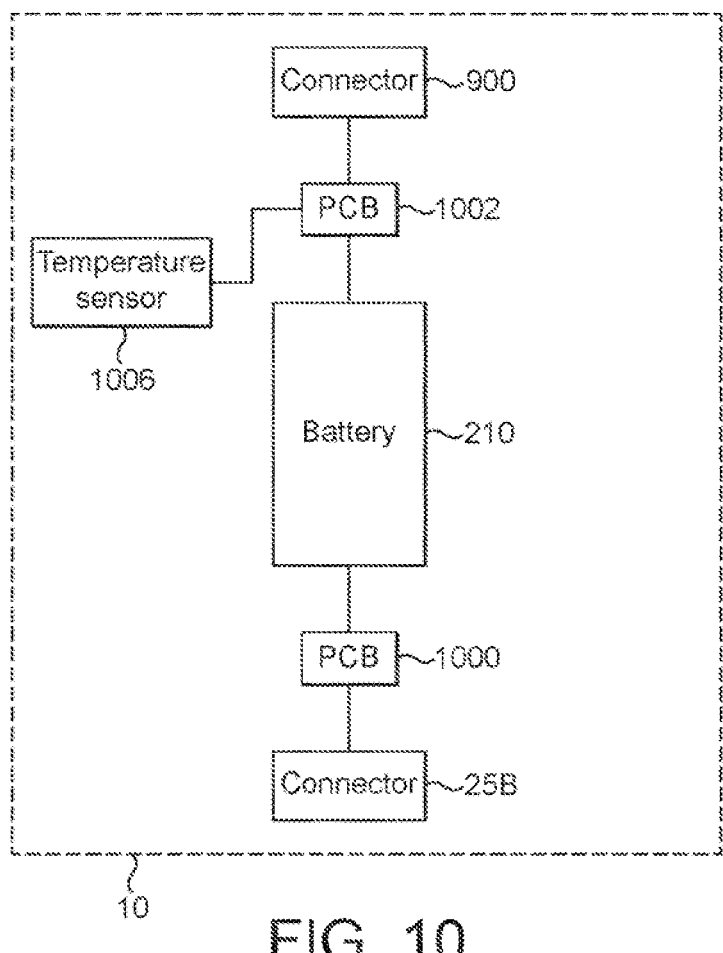
FIG. 10 is a schematic diagram of safety components of the e-cigarette of FIG. 1 in accordance with some embodiments of the disclosure.
Figure 11:
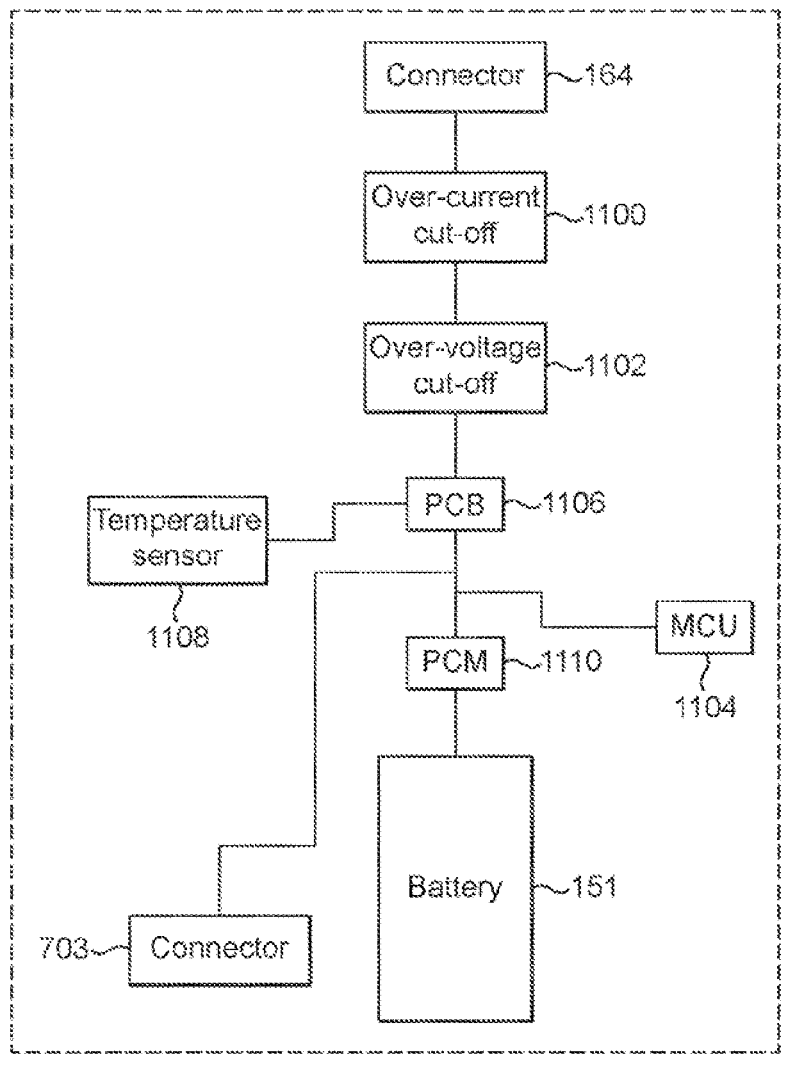
FIG. 11 is a schematic diagram of safety components of the pack of FIG. 7 in accordance with some embodiments of the disclosure.

FIGS. 10 and 11 schematically show some components of the e-cigarette 10 and pack 100, respectively, in accordance with some embodiments of the disclosure. These components help to improve the safety and reliability of the various charging mechanisms provided for the e-cigarette 10 and pack 100.

FIG. 10 schematically depicts some electrical components of the e-cigarette 10. In addition to the connector 900, battery 210 and connector 25B, which have already been discussed in relation to FIGS. 5 and 6, FIG. 10 also shows a tip charge PCB 1002, a temperature sensor 1006, and an over-current protection PCB 1000. It is noted that for the sake of clarity, not all electrical components of the e-cigarette 10 are included in FIG. 10—e.g. some of the components already shown in FIG. 6 have been omitted.

The over-current protection PCB 1000 monitors the current flowing through the connector 25B during operation of the e-cigarette 10. It is recalled that, during use of the e-cigarette 10, the CPU 550 detects when a user is drawing air through the e-cigarette 10 using information from the sensor unit 215 and causes current to flow to the heater 365 in the cartomizer 30 via the connector 25B. If there is a short circuit at the heater 365, for example, there will be a sudden increase in current flowing through the heater 365 and connector 25B. The short circuit might occur for reasons such as an electrical fault at the heater 365, the heating circuit having been tampered with, excessive moisture making contact with the heater 365, etc. A short circuit of the heater 365 may risk damage occurring to the e-cigarette device or, worse, injury to the user.

Accordingly, the over-current protection PCB 1000, upon detection of a current through the connector 25B which is deemed too high (that is, above a certain predetermined threshold), causes the supply of current from the battery 210 to the connector 25B to be cut. This reduces the chance of damage to the e-cigarette 10 and of injury to the user due to such a short circuit.

The predetermined current threshold is set such that dangerously high currents indicative of a short circuit are cut off, but normal, non-dangerous variations in the current are not cut off (thus avoiding unnecessary inconvenience to the user). For example, the threshold for the current supply from the battery 210 to the heater 365 may be set somewhere in the range 40-250 milliAmps, or more precisely, in the range 60-120 milliAmps, such that any current greater than this threshold amount triggers a circuit cut off.

The PCB 1000 may also cut-off if the voltage of the battery 210 is too low, for example, below about 3.1 or 3.2V. This generally indicates that the battery 210 is in a state of low charge, and this could potentially prevent correct (or satisfactory) operation of the heater coil.

The over-current protection PCB 1000 may also monitor current flowing through the connector 25B, and/or voltage applied at connector 25B, during re-charging of the e-cigarette 10 via USB connector 25B. For example, the expected voltage applied by a USB charger to the USB connector 25B may be 5V, so that the over-voltage cut-off might be set, by way of illustration, at 6V. The over-current protection PCB 1000 therefore provides protection for the e-cigarette 10 both during re-charging (against excessive re-charging voltage), and also during normal operation (against excessive current draw).

The tip charge PCB 1002 acts as a controller for monitoring and controlling power flow from the pack 100 to the e-cigarette battery 210 during re-charging. For example, the tip charge PCB may cut off the power flow from the pack 100 to the battery 210 if the voltage and/or current received via connector 900 is too high—e.g. exceeds a predetermined threshold for voltage or current. The thresholds can be set to tolerate the full range of normal operating conditions, but to trigger (cut off) before a level that might start to cause damage to the e-cigarette 10.

The tip charge PCB 1002 is connected to the temperature sensor 1006. The temperature sensor 1006 is in thermal contact with the battery 210 so as to be responsive to the temperature of the battery 210. (Thus temperature sensor 1006 is normally an additional device to temperature sensor 563 shown in FIG. 6, since the former is positioned to measure the temperature of the battery 210, while the latter is positioned to measure the temperature of the airflow into the e-cigarette 10.)

As the battery 210 is (re)charged using the connector 900 (that is, when the e-cigarette 10 is inserted into the tube 132A of the pack 100 so that the connector 900 makes electrical contact with the connector 703 of the pack), the battery 210 will normally heat up. However, if the battery 210 gets too hot (perhaps due to a fault in the battery 210 or because the ambient temperature is very warm), this may cause damage to the e-cigarette 10, to the pack 100 or, worse, injury to the user. Also, if the battery 210 is very cold (perhaps due to the ambient temperature being very cold), then attempting to charge the battery 210 may cause damage to it. Thus, the tip charge PCB 1002 monitors the temperature of the battery 210 using information generated by the temperature sensor 1006. If the temperature gets too hot (that is, above a predetermined upper threshold) or too cold (that is, below a predetermined lower threshold), the tip charge PCB 1002 cuts off the current supply to the battery 210 from the connector 900. This reduces the chance of damage to the e-cigarette 10 or pack 100 or of injury to the user due to the battery 210 overheating, as well as reducing the chance of damage to the battery 210 by charging it when it is too cold.

The predetermined upper temperature threshold is set such that high temperatures indicative of potential battery overheating result in current to the battery 210 being cut off, whereas lower increases in battery temperature do not result in the current to the battery 210 being cut off. Similarly, the predetermined lower temperature threshold is set such that low temperatures which could damage the battery 210 result in current to the battery 210 being cut off, whereas smaller reductions in battery temperature do not result in current to the battery 210 being cut off. Examples of the upper and lower temperature thresholds are about 60° C. and about 0° C., or about 45° C. and about 10° C., respectively.

The tip charging PCB 1002 also ensures that current is only supplied to the battery 210 for a predetermined time period before it is cut off. This ensures that the battery 210 is not subjected to overcharging, in which the battery 210 is continuously charged even though it is at full capacity (which might damage the battery 210). The predetermined time period is set so that the battery 210 can be charged to its full capacity (maximizing the length of time that the user can use the e-cigarette 10 without having to recharge it), but also avoiding overcharging of the battery 210. For example, the predetermined time period may be set somewhere in the range 1 to 4 hours, such as between 1 and 2 hours.

Overall therefore, the over-current protection PCB 1000 and/or the tip charging PCB 1002 provide protection based on the parameters or dimensions set out below.

time—there is a threshold for a maximum re-charge duration.

temperature—there are upper and lower thresholds for a maximum and minimum battery temperature respectively. These thresholds are applied in particular when battery 210 is being re-charged, but may also be applied during normal operation of the device—i.e. when the user is inhaling through e-cigarette 10 to activate heater 365 and produce vapor output.

voltage—there is a threshold for a maximum voltage applied during re-charge.

current—there is a threshold for a maximum current flowing during re-charge and/or for a maximum current flowing from the body 20 to the cartomizer 30 during normal operation of the e-cigarette.

In the event that any of the above thresholds is breached, then the re-charge (or operation of the device as appropriate) can be terminated by activating a suitable cut-off. It will be appreciated that protection for each of the above four parameters or dimensions may generally be implemented as appropriate in the over-current protection PCB 1000 and/or in the tip charge PCB 1002, where the former relates to the re-charge or normal operation through connector 25B, while the latter relates to re-charge through connector 900.

Note that there is certain overlap or redundancy between the different dimensions of the protection. For example, the cut-off of the current supply to the battery 210 after a predetermined time period has elapsed will generally help to reduce the chance of the battery 210 becoming too hot during re-charging. However, this overlap gives greater protection, since if, for any reason, the temperature-monitoring function does not work correctly, then because current is only supplied to the battery 210 for the predetermined time period (rather than indefinitely), this may still prevent the battery from overheating.

The functionality shown in FIG. 10 may be implemented using separate components. For example, the tip charge PCB 1002 may be implemented as a separate component such as a BQ24040 PCB from Texas Instruments (this can help support the use of off-the-shelf components). Alternatively, one or both of the tip charge and over-current protection PCBs 1002, 1000, may be integrated as part of the microcontroller 555 (see FIG. 6). A further possibility is that the tip charge and over-current protection PCBs 1002, 1000 are integrated together into a single device which is separate from the microcontroller 555.

As described above, the e-cigarette 10 is provided with two contacts that can be used for re-charging, namely connector 900 (for charging via pack 100), and also connector 25B, which can be used for charging via a (micro) USB connector when the e-cigarette 10 is in a disassembled state (the body 20 and cartomizer 30 separated). Connector 25B can also be used for supplying power from the body to the cartomizer when the e-cigarette 10 is in an assembled state. The tip charge PCB 1002 provides protection and control in relation to charging the e-cigarette via connector 900. The over-current protection PCB 1000 provides protection and control in relation to supplying power from the body 20 to the cartomizer 30.

The over-current protection PCB 1000 may also provide protection and control in relation to charging the e-cigarette 10 from an external power supply via connector 25B, analogous to the protection provided by tip charge PCB 1002 when re-charging via connector 900. For example, this protection and control may involve monitoring the current and/or voltage supplied from connector 25B, and cutting off the power supply to the battery 210 if the current or voltage exceeds a respective limit. Further, the over-current protection PCB may cut off power if the duration (time) of charging exceeds some threshold level, or if the temperature of the e-cigarette 10 is too hot or too cold. Note that over-current protection PCB 1000 may have access to temperature sensor 1006 for making this latter determination, or may be provided with its own, additional temperature sensor (not shown in FIG. 10).

FIG. 11 schematically shows some electrical components of the recharge pack 100 in accordance with some embodiments of the disclosure. In addition to the connector 164, battery 151 and connector 703, as already discussed in relation to FIGS. 8 and 9, FIG. 11 also shows an over-current cut-off unit 1100, an over-voltage cut-off unit 1102, a multipoint control unit (MCU) 1104, a regulator PCB 1106, a temperature sensor 1108 and a protection circuit module (PCM) 1110. Similar to FIG. 10, certain components of the pack 100 have been omitted from FIG. 11 for the sake of clarity.

The pack 100 supports three main charging operations (modes). (1) When the connector 164 is electrically connected to a power source (such as a USB charging device), power flows from the power source via the connector 164 to the battery 151. This allows the battery 151 to be charged. (2) When the connector 164 is electrically connected to a power source (such as a USB charging device), power also flows from the power source via the connectors 164 and 703 to an e-cigarette 10 (if present). This allows the battery 210 of the e-cigarette 10 to be charged (simultaneously with the pack battery 151). (3) When the connector 900 of an e-cigarette 10 is electrically connected to the connector 703, but there is no external power supply for the pack at connector 164, power flows from the battery 151 to the e-cigarette 10 via the connector 703. This allows the battery 210 of the e-cigarette 10 to be charged. These power flows are generally controllable by one or more of the over-current cut-off 1100, over-voltage cut-off 1102, regulating PCB 1106, PCM 1110 and MCU 1104. The control of the battery charging and e-cigarette charging power flows will now be described in more detail.

The regulating PCB 1106 is the principal controller of power for charging the battery 151 in that it regulates the current and voltage supplied to the battery 151 during charging. In some embodiments, the regulating PCB 1106 is implemented using a MicrOne ME4057 device; however, other implementations may use different devices (or may integrate the functionality of the regulating PCB 1106 into other components).

The current and voltage are regulated by PCB 1106 such that they remain substantially constant at predetermined values, which are selected to provide efficient, timely and safe charging of the battery 151 and to help enhance or at least maintain the battery's long-term lifespan (the long-time lifespan being related to the total number of times a rechargeable battery can be charged and recharged before it starts permanently losing its capacity).

When the battery 151 is a lithium ion (Li-ion) battery, the predetermined values of the current and voltage may be about 400-500 mA and about 4.2V respectively during charging. The predetermined values may also change over the course of a single battery charge. For example, when the battery 151 is first charged, the predetermined value of the current may be lower. Then, at a later time, when the battery 151 has stored a certain amount of charge, the predetermined value of the current may be stepped up to about 400-500 mA as above. This prevents the battery 151 from being subjected to a relatively large current when it is completely discharged (or close to being completely discharged), which might otherwise cause damage to the battery 151 and reduce its long-term lifespan. Other implementations may have a different maximum current supply or voltage supply, such as somewhere in the region 250-600 mA and somewhere in the region 3-6V (respectively).

The regulating PCB 1106 is also connected to the temperature sensor 1108. The temperature sensor 1108 is in thermal contact with the battery 151 so as to be responsive to the temperature of the battery 151. As the battery 151 is charged using power supplied via the connector 164, the battery 151 will normally heat up. However, if the battery 151 gets too hot (perhaps due to a fault in the battery 151 or because the ambient temperature is very warm), this may cause damage to the battery 151 or pack 100 or, worse, injury to the user. Also, if the battery 151 is very cold (perhaps due to the ambient temperature being very cold), then attempting to charge the battery 151 may also cause damage to the battery 151. Thus, the regulating PCB 1106 monitors the temperature of the battery 151 using information provided by the temperature sensor 1108. If the temperature gets too hot (that is, above a certain predetermined upper threshold) or too cold (that is, below a predetermined lower threshold), then the regulating PCB 1106 cuts off the current supply to the battery 210. This reduces the chance of damage to the battery 151 or pack 100 and of injury to the user due the battery 151 overheating, and reduces the chance of damage to the battery 151 by charging it when it is too cold.

The predetermined upper temperature threshold is set such that high temperatures indicative of battery overheating result in current to the battery 151 being cut off, but normal (routine) increases in battery temperature, which do not risk damage, do not result in current to the battery 151 being cut off. Similarly, the predetermined lower temperature threshold is set such that for low temperatures, which might result in damage to the battery 151, the current to the battery 151 is cut off. However, falls in battery temperature that remain within the specified normal operating limits do not result in current to the battery 151 being cut off. Examples of the upper and lower temperature thresholds are about 45° C. and about −5° C., respectively. However, for some batteries, the upper temperature threshold may be up to about 60° C. and the lower temperature threshold may be down to about −20° C. Typically the upper threshold is in the range 45 to 60° C., while the lower threshold is in the range 0 to −20° C.

In some implementations, the pack 100 may be provided with a temperature sensor that measures ambient temperature within the pack 100 (typically close to the location of any re-charging e-cigarette inside the pack 100). Again, this sensor may trigger a power cut-off if the temperature is found to rise above a certain threshold, such as 50° C. Note that such a temperature sensor may be provided in addition to or instead of temperature sensor 1108 as shown in FIG. 11 (which is intended to measure primarily the temperature of the battery 151).

In addition to the current and voltage control implemented by the regulating PCB 1106, the pack 100 is provided with further safeguards against excessive voltages or currents that are too high and which may therefore cause damage to the battery 151 or other components of the pack 100 (or injury to the user). For example, pack 100 also includes the over-current cut-off unit 1100 and the over-voltage cut-off unit 1102.

The over-current cut-off unit 1100 cuts off the power supplied from the connector 164 to the other components of the pack 100 (including the regulating PCB 1106) when it detects that the current exceeds a predetermined threshold. Even though the current supplied to the battery 151 is regulated by the regulating PCB 1106 (as already described), the over-current cut-off unit 1100 provides an extra layer of protection to the battery 151 and other pack components. For example, the over-current cut-off unit 1100 helps to reduce the risk of damage to the components of the pack in the case that too much current is supplied via the connector 164 (this could happen, for example, if an unsuitable charging device which supplies too much current is connected to the connector 164, or if one of the components of the pack short circuits).

The over-current cut-off unit 1100 may be implemented, for example, using a thermal resettable fuse, which trips out by entering a high impedance state when the current exceeds the predetermined threshold. At a later time, when the temperature cools down, the thermal resettable fuse re-enters a low impedance state again, thereby allowing current to flow again (so that use of the pack 100 may be resumed). The predetermined current threshold is set such that a high current which might cause damage is cut off, but such that variations in the current within normal and acceptable operating parameters do not produce a cut-off. For example, the predetermined current threshold may be set at about 1 amp.

The over-voltage cut-off unit 1102 cuts off the power supplied from the connector 164 to the other components of the pack 100 (including the regulating PCB 1106) if it detects that the supply voltage has exceeded a predetermined threshold. Even though the voltage supplied to the battery 151 is regulated by the regulating PCB 1106 (as described above), the over-voltage cut-off unit 1100 provides an extra layer of protection for the battery 151 and other pack components, thus reducing the risk of damage to the components in the pack 100 (or potential injury to the user) in the case that too high a voltage is supplied via the connector 164. Such a high voltage might occur, for example, if an unsuitable charging device that supplies too high a voltage were to be connected to the connector 164. The predetermined voltage threshold is set such that a dangerously high voltage is cut off (i.e. one that might damage the device, or possibly cause injury to a user), but that variations of the voltage within the normal (non-dangerous) operating range are not cut off. For example, the predetermined voltage threshold may be set at about 6V, thereby ensuring that a 5V USB charging device will not trigger the over-voltage cut-off unit 1102, but that higher voltages will trigger the over-voltage cut-off unit 1102.

The PCM 1110, which sits between the regulating PCB and the battery 151, monitors the current and voltage between the battery 151 and other components of the pack (including the regulating PCB 1106) and trips the electrical connection between the battery 151 and the other pack components in the case that the current or voltage moves outside a predetermined current or voltage range (respectively). This monitoring is performed both for charging the battery 151 (from an external power supply via connector 164), and also for discharging the battery 151 (to supply power to battery 210 in the e-cigarette 10 via connector 703, as well as to other components in the pack 100, such as lighting 128). In particular, during charging or discharging of the battery 151, if either the current or voltage exceeds (respectively) a predetermined upper threshold, then the electrical connection between the battery 151 and other pack components is tripped (cut off), i.e. the flow of power between the battery 151 and the other pack components is prevented or at least seriously impeded. This helps to reduce the risk of too much current or voltage being supplied to or from the battery 151 and the problems associated with this (such as damage to the battery 151 and/or other components, injury to the user, etc.). The threshold for the over-voltage may be set, for example, at about 4.3V, while the threshold for the over-current may be set, for example, in the range 1.5-2.5 amps, e.g. at about 1.8 amps.

Also, during discharging of the battery 151, e.g. to re-charge battery 210 in e-cigarette 10, if the voltage from the battery 151 falls below a predetermined lower threshold, then the electrical connection between the battery 151 and the other pack components, such as connector 703, is cut off. This helps to prevent damage to the battery 151 that might otherwise occur due the continued drawing of current from the battery 151 when it has a low remaining capacity and is outputting a low voltage (this can happen with certain rechargeable batteries such as Li-ion batteries).

The PCM 1110 may comprise a separate PCB or may (for example) be integrated as part of the battery 151. Due to the position of the PCM 1110 within the electrical circuit (that is, between the battery 151 and other pack components), the PCM 1110 is able to detect voltage/current abnormalities which may not be detectable by the other voltage/current-controlling pack components (such as the regulator PCB 1106, over-current cut-off unit 1100 and over-voltage cut-off unit 1102). The PCM 1110 thus adds an extra layer of protection against the risk of damage to the battery 151 or any of the other pack components (or e-cigarette 10), and against potential injury to the user caused by abnormal current or voltage values.

The PCM 1110 may comprise any standard PCB suitable for detecting whether or not an applied voltage and/or current is within certain predetermined limits. Furthermore, the PCM 1110 may comprise a metal-oxide-semiconductor field-effect transistor (MOSFET) for detecting when the current exceeds the predetermined current threshold.

The MCU 1104 ensures that current is only supplied to the battery 151 during charging for a predetermined time period before it is cut off. This helps to ensure that the battery 151 is not subjected to overcharging, in which the battery 151 is continuously charged even though it is at full capacity (this may damage the battery 151). The predetermined time period is set to allow the battery to be charged to its full capacity (thereby maximizing the length of time between charges for which the user can use the pack 100, such as to recharge the e-cigarette 10), but also avoiding overcharging of the battery 151. For example, the predetermined time period may be set somewhere in the range 2 to 8 hours, such as between 4 and 6 hours.

The cut-off of the current supply to the battery 151 after the predetermined time period has elapsed may also help reduce the chance of the battery 151 becoming too hot or too cold. Although this is managed by the temperature-monitoring function of the regulating PCB 1106 (as already described), if, for any reason, the temperature-monitoring function does not work correctly, then, because current is only supplied to the battery 151 for the predetermined time period (rather than indefinitely), the above-discussed problems associated with continuously supplying current to the battery 151 when it is too hot may at least be alleviated.

The MCU 1104 also ensures that current is only supplied from the battery 151 during charging of an e-cigarette 10 via the connector 703 for a predetermined time before it is cut off. This provides an extra layer of protection to help prevent overcharging of the battery 210 of the e-cigarette 10 (in addition to the timed current cut-off function of the tip charge PCB 1002 of the e-cigarette 10 itself, as described above). For example, the predetermined time period may be set somewhere in the range 2 to 6 hours, such as between 3 and 5 hours. Note that this cut-off applies irrespective of whether the current is being supplied to the e-cigarette 10 via the external power source and connector 164 or from the pack battery 151.

The overcharging of the e-cigarette battery 210 may be avoided primarily by the predetermined e-cigarette charge time of the tip charge PCB 1002, with the predetermined e-cigarette charge time of the MCU 1104 then being set at the same or a somewhat larger value so as to act as a back-up in the event that the timer of the MCU 1104 experiences a fault and fails to cut off the current at the appropriate time. Thus, overcharging of the e-cigarette 10 can be avoided even if there is a failure in the timer function of the e-cigarette 10.

Overall therefore, the pack 100 of FIG. 11 may implement a large number of protection features such as: protection against high voltage and/or high current received from connector 164, and/or from power being supplied from connector 164 for too long; protection against the pack 100 and/or battery 151 having too high (or too low) a temperature (this protection is relevant for all 3 of the charging modes defined above); protection against high voltage and/or high current being supplied to an e-cigarette 10 via connector 703, and/or from power being supplied to the e-cigarette 10 via connector 703 for too long (this current/voltage and timing protection can apply irrespective of whether the e-cigarette 10 is being re-charged by an external power supply or by pack battery 151. There may also be a cut-off implemented by PCB 1106 if the voltage of pack battery 151 exceeds a predetermined level while the pack battery 151 is re-charging (typically somewhere in the range 4.2-4.5V), or if the voltage of the pack battery 151 falls below a predetermined level while the pack battery 151 is discharging (to the e-cigarette or other components of pack). This lower voltage may be set, for example, in the range 2-3V, such as approximately 2.5V.

One or more of the components of FIG. 11, such as the regulating PCB 1106, PCM 1110 or MCU 1104 may be integrated as part of the PCBs 160, 135 or 154 shown in FIG. 8. Alternatively, one or more of them may be separate components. In addition, the functionality may be distributed differently between the different components. Similarly, there are numerous potential variations for the connector 703 of the pack 100 and the connector 900 of the e-cigarette 10. For example, the connectors 703, 900 may vary in position, size, shape, etc., so long as the connectors 703 and 900 are able to provide an electrical connection with each other to allow current to flow from the battery 151 of the pack 100 to the battery 210 of the e-cigarette 10.

In light of the above-mentioned embodiments, it can be seen that the various safety components of the e-cigarette 10 (as described with reference to FIG. 10) and of the pack 100 (as described with reference to FIG. 11) all contribute to an overall improved control of voltage, current and temperature in the e-cigarette 10 and pack 100 during charging of the e-cigarette 10 and the pack 100. This results in a rechargeable e-cigarette 10 and pack 100 which operate reliably and safely.

It will also be appreciated, however, that even if only some (rather than all) of the above-mentioned safety components of the e-cigarette 10 and/or pack 100 are implemented, then improved reliability and safety of the rechargeable e-cigarette 10 and/or pack 100 may still be enjoyed.

Furthermore, the approach described herein can be extended to a range of electronic vapor provision systems, such as heat-not-burn devices (which may include some plant matter or extract, for example, tobacco leaf, which is then heated or provided with steam to produce the desired vapor). One example of such an alternative form of electronic vapor provision system is described in US 2011/0226236, which discloses an inhaler containing an evaporator based on a composite planar structure that incorporates both a heating mechanism and wicking mechanism.

The approach described herein provides protection against malfunction by:

a) monitoring and regulating across multiple parameters or dimensions, in particular, using time, temperature, voltage and current. Not only do these different dimensions can help to detect different fault conditions, but they also help to provide redundant (backup) protection against certain fault conditions, should one of the monitoring and regulating systems itself fail;

b) monitoring and regulating at various locations within both the e-cigarette and also in the pack 100. Monitoring and regulation at multiple locations within one device (i.e. the pack 100 or the e-cigarette 10), potentially for the same parameter (current, voltage, etc), again can help to detect different fault conditions, as well as helping to provide redundant (backup) protection against certain fault conditions, should one of the monitoring and regulating systems itself fail. In addition, providing corresponding monitoring and regulation functionality both in the e-cigarette 10 itself, and also in the charging pack 100, further helps to provide some protection should a user try to use a different charging pack 100 (i.e. one without the safety components described above) for re-charging the e-cigarette 10, or to use the charging pack 100 to re-charge a different e-cigarette (i.e. one without the safety components described above).

In conclusion, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention (s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc other than those specifically described herein. The disclosure may include one or more other inventions not presently claimed, but which may be claimed in future.

The invention claimed is:

1. A pack for containing and recharging an e-cigarette, said pack comprising:

a re-chargeable pack battery;

a first connector which is electrically connectable to an external power source;

a first recharging mechanism for re-charging the pack battery using the external power source when the first connector is electrically connected to the external power source;

a second connector which is electrically connectable to an e-cigarette contained within the pack; and a second recharging mechanism for re-charging the e-cigarette when the e-cigarette is electrically connected to the second connector;

wherein:

the first recharging mechanism comprises:

a first protection circuit module for preventing electrical power flow from the external power source to the pack battery when the current supplied to the pack battery exceeds a first predetermined current threshold or the voltage supplied to the pack battery exceeds a first predetermined voltage threshold, wherein the pack comprises a temperature sensor, and the first recharging mechanism monitors a temperature using information provided by the temperature sensor; and wherein the first recharging mechanism is configured to cut off current supply to the battery if the temperature goes above a predetermined upper temperature threshold and if the temperature goes below a predetermined lower temperature threshold.

2. A pack according to claim 1, further comprising a regulator for converting the voltage and current of electrical power supplied from the external power source to respective predetermined voltage and current values prior to the electrical power being supplied to the pack battery.

3. A pack according to claim 2, wherein the predetermined voltage value supplied to the pack battery by the regulator is in the range 4-4.5V and the predetermined current value supplied to the pack battery by the regulator is in the range 400-500 mA.

4. A pack according to claim 2, wherein the first recharging mechanism further comprises:

an over-current cut-off unit for preventing electrical power flow from the external power source to the regulator when the current supplied by the external power source exceeds a third predetermined current threshold; and an over-voltage cut-off unit for preventing electrical power flow from the external power source to the regulator when the voltage supplied by the external power source exceeds a third predetermined voltage threshold value.

5. A pack according to claim 4, wherein the third predetermined current threshold is about 1 A and the third predetermined voltage threshold is about 6V.

6. A pack according to claim 1, wherein the second protection circuit module is configured to prevent electrical power flow from the pack battery to the e-cigarette if the voltage supplied by the pack battery is reduced below a predetermined lower voltage threshold.

7. A pack according to claim 1, wherein:

the first recharging mechanism further comprises a first timer configured to start timing when electrical power starts flowing from the external power source to the pack battery and to prevent electrical power flow from the external power source to the pack battery after a first predetermined time period has elapsed; and the second recharging mechanism further comprises a second timer configured to start timing when electrical power starts flowing from the pack battery to the e-cigarette and to prevent electrical power flow from the pack battery to the e-cigarette after a second predetermined time period has elapsed.

8. A pack according to claim 7, wherein the first predetermined time period is between 4 and 6 hours and the second predetermined time period is between 1 and 2.5 hours.

9. A pack according to claim 1, wherein the lower temperature threshold is about −5° C., and the upper temperature threshold is about 45° C.

10. A pack for containing and recharging an e-cigarette, said pack comprising:

a pack battery;

a first connector which is electrically connectable to an external power source;

a first recharging mechanism for re-charging the pack battery using the external power source when the first connector is electrically connected to the external power source;

a second connector which is electrically connectable to the e-cigarette when the e-cigarette is contained within the pack; and a second recharging mechanism for re-charging the e-cigarette using the pack battery when the e-cigarette is electrically connected to the second connector and contained within the pack;

wherein the first recharging mechanism is configured to monitor and regulate the re-charging of the battery pack based on voltage, current, time and temperature of the pack battery, wherein the pack comprises a temperature sensor, and the first recharging mechanism monitors temperature of the pack battery using information provided by the temperature sensor, and wherein the first recharging mechanism is configured to cut off currently supply to the battery if the temperature goes above a predetermined upper temperature threshold and if the temperature goes below a predetermined lower temperature threshold.

11. A system comprising:

a pack according to claim 1; and a rechargeable e-cigarette comprising:

a battery;

a connector which is electrically connectable to an external battery pack; and a recharging mechanism for re-charging the battery using the external battery pack when the connector is electrically connected to the external battery pack, the recharging mechanism comprising:

a charge controller for controlling electrical power flow from the external battery pack to the battery;

a temperature sensor which is response to the temperature of the battery; and a timer; wherein:

the charging controller is configured to prevent electrical power flow from the external battery pack to the battery when the temperature of the battery is determined to lie outside a range defined between a lower temperature threshold and an upper temperature threshold; and the timer is configured to start timing when electrical power starts flowing from the external battery pack to the battery and to prevent electrical power flow from the external battery pack to the battery after a predetermined time period has elapsed, wherein the charging controller is configured to prevent electrical power flow from the external battery pack to the battery when the voltage or current of the electrical power flow to the battery exceed a predetermined voltage or current threshold.

12. A system comprising:

a pack according to claim 10; and a rechargeable e-cigarette comprising:

a battery;

a connector which is electrically connectable to an external battery pack; and a recharging mechanism for re-charging the battery using the external battery pack when the connector is electrically connected to the external battery pack, the recharging mechanism comprising:

a charge controller for controlling electrical power flow from the external battery pack to the battery;

a temperature sensor which is response to the temperature of the battery; and a timer; wherein:

the charging controller is configured to prevent electrical power flow from the external battery pack to the battery when the temperature of the battery is determined to lie outside a range defined between a lower temperature threshold and an upper temperature threshold; and the timer is configured to start timing when electrical power starts flowing from the external battery pack to the battery and to prevent electrical power flow from the external battery pack to the battery after a predetermined time period has elapsed, wherein the charging controller is configured to prevent electrical power flow from the external battery pack to the battery when the voltage or current of the electrical power flow to the battery exceed a predetermined voltage or current threshold.

13. A system comprising:

a pack according to claim 1; and a rechargeable e-cigarette comprising:

a battery;

a connector which is electrically connectable to an external battery pack; and a recharging mechanism for re-charging the battery using the external battery pack when the connector is electrically connected to the external battery pack, the recharging mechanism comprising:

a charge controller for controlling electrical power flow from the external battery pack to the battery;

wherein the charge controller is configured to monitor and regulate the re-charging of the battery based on voltage, current, time and temperature of the battery, wherein the charging controller is configured to prevent electrical power flow from the external battery pack to the battery when the voltage or current of the electrical power flow to the battery exceed a predetermined voltage or current threshold.

14. A system comprising:

a pack according to claim 10; and a rechargeable e-cigarette comprising:

a battery;

a connector which is electrically connectable to an external battery pack; and a recharging mechanism for re-charging the battery using the external battery pack when the connector is electrically connected to the external battery pack, the recharging mechanism comprising:

a charge controller for controlling electrical power flow from the external battery pack to the battery;

wherein the charge controller is configured to monitor and regulate the re-charging of the battery based on voltage, current, time and temperature of the battery, wherein the charging controller is configured to prevent electrical power flow from the external battery pack to the battery when the voltage or current of the electrical power flow to the battery exceed a predetermined voltage or current threshold.

* * * * *